US011150781B2

(12) United States Patent
Forstall et al.

(10) Patent No.: US 11,150,781 B2
(45) Date of Patent: Oct. 19, 2021

(54) WORKFLOW WIDGETS

(71) Applicant: Apple Inc., Cupertino, CA (US)

(72) Inventors: Scott Forstall, Mountain View, CA (US); Imran A. Chaudhri, San Francisco, CA (US); John O. Louch, San Luis Obispo, CA (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 15/365,737

(22) Filed: Nov. 30, 2016

(65) Prior Publication Data

US 2017/0199633 A1 Jul. 13, 2017

Related U.S. Application Data

(63) Continuation of application No. 12/784,438, filed on May 20, 2010, now Pat. No. 9,513,930, which is a continuation of application No. 11/432,283, filed on May 10, 2006, now Pat. No. 7,752,556.

(51) Int. Cl.
*G06F 3/048* (2013.01)
*G06F 3/0482* (2013.01)
*G06F 9/451* (2018.01)
*G06F 3/0481* (2013.01)
*G06F 3/0486* (2013.01)
*G06F 3/0484* (2013.01)

(52) U.S. Cl.
CPC .......... *G06F 3/0482* (2013.01); *G06F 3/0481* (2013.01); *G06F 3/0486* (2013.01); *G06F 3/04817* (2013.01); *G06F 9/451* (2018.02); *G06F 3/04845* (2013.01)

(58) Field of Classification Search
None
See application file for complete search history.

(56) References Cited

U.S. PATENT DOCUMENTS

| | | |
|---|---|---|
| 4,752,893 A | 6/1988 | Guttag et al. |
| 5,007,033 A | 4/1991 | Kubota et al. |
| 5,168,441 A | 12/1992 | Onarheim et al. |
| 5,260,778 A | 11/1993 | Kauffman et al. |
| 5,289,574 A | 2/1994 | Sawyer |
| 5,297,250 A | 3/1994 | Leroy et al. |

(Continued)

FOREIGN PATENT DOCUMENTS

| | | |
|---|---|---|
| CN | 1425151 | 6/2003 |
| DE | 102 42 378 | 3/2004 |

(Continued)

OTHER PUBLICATIONS

"Coolsmartphone"; Apr. 17, 2006, [online] [Retrieved on Sep. 11, 2009]; Retrieved from the Internet, URL: http://www.web.archive.org/web/20060417080115/http://www.coolsmartphone.com/article569.html 24 pages.

(Continued)

*Primary Examiner* — William C Trapanese
(74) *Attorney, Agent, or Firm* — Fish & Richardson P.C.

(57) ABSTRACT

Systems, methods, computer-readable mediums, user interfaces and other implementations are disclosed for workflow widgets. In some implementations, a widget workflow method includes: launching a widget at a first device; and updating the widget with content created at a second device.

17 Claims, 15 Drawing Sheets

(56) References Cited

U.S. PATENT DOCUMENTS

| | | |
|---|---|---|
| 5,303,388 A | 4/1994 | Kreitman et al. |
| 5,351,995 A | 10/1994 | Booker |
| 5,357,603 A | 10/1994 | Parker |
| 5,379,057 A | 1/1995 | Clough et al. |
| 5,388,201 A | 2/1995 | Hourvitz et al. |
| 5,416,890 A | 5/1995 | Beretta |
| 5,446,891 A | 8/1995 | Kaplan et al. |
| 5,457,476 A | 10/1995 | Jenson |
| 5,481,665 A | 1/1996 | Okada et al. |
| 5,490,246 A | 2/1996 | Brotsky et al. |
| 5,504,675 A | 4/1996 | Cragun et al. |
| 5,515,486 A | 5/1996 | Amro et al. |
| 5,522,022 A | 5/1996 | Rao et al. |
| 5,537,630 A | 7/1996 | Berry et al. |
| 5,544,358 A | 8/1996 | Capps et al. |
| 5,564,002 A | 10/1996 | Brown |
| 5,570,109 A | 10/1996 | Jenson |
| 5,583,833 A | 12/1996 | Capps et al. |
| 5,588,098 A | 12/1996 | Chen et al. |
| 5,602,997 A | 2/1997 | Carpenter et al. |
| 5,603,034 A | 2/1997 | Swanson |
| 5,621,906 A | 4/1997 | O'Neill et al. |
| 5,636,336 A | 6/1997 | Adachi |
| 5,638,501 A | 6/1997 | Gough et al. |
| 5,644,737 A | 7/1997 | Tuniman et al. |
| 5,644,739 A | 7/1997 | Moursund |
| 5,651,107 A | 7/1997 | Frank et al. |
| 5,657,049 A | 8/1997 | Ludolph et al. |
| 5,659,693 A | 8/1997 | Hansen et al. |
| 5,659,694 A | 8/1997 | Bibayan |
| 5,666,416 A | 9/1997 | Micali |
| 5,666,530 A | 9/1997 | Clark et al. |
| 5,671,343 A | 9/1997 | Kondo et al. |
| 5,678,015 A | 10/1997 | Goh |
| 5,689,287 A | 11/1997 | MacKinlay et al. |
| 5,689,664 A | 11/1997 | Narayanan et al. |
| 5,708,764 A | 1/1998 | Borrel et al. |
| 5,710,884 A | 1/1998 | Dedrick |
| 5,710,922 A | 1/1998 | Alley et al. |
| 5,721,848 A | 2/1998 | Joseph |
| 5,724,492 A | 3/1998 | Matthews, III et al. |
| 5,727,129 A | 3/1998 | Barrett et al. |
| 5,727,135 A | 3/1998 | Webb et al. |
| 5,731,819 A | 3/1998 | Gagne et al. |
| 5,742,285 A | 4/1998 | Ueda |
| 5,742,768 A | 4/1998 | Gennaro et al. |
| 5,754,174 A | 5/1998 | Carpenter et al. |
| 5,760,773 A | 6/1998 | Berman et al. |
| 5,764,229 A | 6/1998 | Bennett |
| 5,764,238 A | 6/1998 | Lum et al. |
| 5,767,854 A | 6/1998 | Anwar |
| 5,786,815 A | 7/1998 | Ford |
| 5,790,120 A | 8/1998 | Lozares et al. |
| 5,793,368 A | 8/1998 | Beer |
| 5,793,376 A | 8/1998 | Tanaka et al. |
| 5,796,402 A | 8/1998 | Ellison-Taylor |
| 5,801,703 A | 9/1998 | Bowden et al. |
| 5,809,230 A | 9/1998 | Pereira |
| 5,835,692 A | 11/1998 | Cragun et al. |
| 5,835,693 A | 11/1998 | Lynch et al. |
| 5,838,316 A | 11/1998 | Arruza |
| 5,838,906 A | 11/1998 | Doyle et al. |
| 5,845,251 A | 12/1998 | Case |
| 5,845,293 A | 12/1998 | Veghte et al. |
| 5,870,734 A | 2/1999 | Kao |
| 5,873,076 A | 2/1999 | Barr et al. |
| 5,877,741 A | 3/1999 | Chee et al. |
| 5,877,762 A | 3/1999 | Young et al. |
| 5,878,219 A | 3/1999 | Vance, Jr. et al. |
| 5,880,733 A | 3/1999 | Horvitz et al. |
| 5,880,743 A | 3/1999 | Moran et al. |
| 5,883,639 A | 3/1999 | Walton et al. |
| 5,900,876 A | 5/1999 | Yagita et al. |
| 5,903,896 A | 5/1999 | Waldman et al. |
| 5,914,716 A | 6/1999 | Rubin et al. |
| 5,917,436 A | 6/1999 | Endo et al. |
| 5,920,659 A | 7/1999 | Iverson et al. |
| 5,929,852 A | 7/1999 | Fisher et al. |
| 5,930,501 A | 7/1999 | Neil |
| 5,933,148 A | 8/1999 | Oka et al. |
| 5,949,409 A | 9/1999 | Tanaka et al. |
| 5,950,002 A | 9/1999 | Hoford et al. |
| 5,963,191 A | 10/1999 | Jaaskelainen, Jr. |
| 5,974,238 A | 10/1999 | Chase, Jr. |
| 5,974,253 A | 10/1999 | Nahaboo et al. |
| 5,978,579 A | 11/1999 | Buxton et al. |
| 5,991,735 A | 11/1999 | Gerace |
| 5,999,948 A | 12/1999 | Nelson et al. |
| 6,000,000 A | 12/1999 | Hawkins et al. |
| 6,005,568 A | 12/1999 | Simonoff et al. |
| 6,006,231 A | 12/1999 | Popa |
| 6,006,274 A | 12/1999 | Hawkins et al. |
| 6,011,562 A | 1/2000 | Gagne et al. |
| 6,023,708 A | 2/2000 | Mendez et al. |
| 6,031,937 A | 2/2000 | Graffagnino |
| 6,034,621 A | 3/2000 | Kaufman |
| 6,045,446 A | 4/2000 | Ohshima |
| 6,061,695 A | 5/2000 | Slivka et al. |
| 6,062,978 A | 5/2000 | Martino et al. |
| 6,075,543 A | 6/2000 | Akeley |
| 6,104,391 A | 8/2000 | Johnston, Jr. et al. |
| 6,128,010 A | 10/2000 | Baxter et al. |
| 6,133,915 A | 10/2000 | Arcuri et al. |
| 6,141,005 A | 10/2000 | Hetherington et al. |
| 6,144,381 A | 11/2000 | Lection et al. |
| 6,154,601 A | 11/2000 | Yaegashi et al. |
| 6,157,363 A | 12/2000 | Haine |
| 6,157,371 A | 12/2000 | Smeets |
| 6,157,383 A | 12/2000 | Loop |
| 6,160,552 A | 12/2000 | Wilsher et al. |
| 6,161,176 A | 12/2000 | Hunter et al. |
| 6,166,748 A | 12/2000 | Van Hook et al. |
| 6,167,533 A | 12/2000 | Potterveld et al. |
| 6,178,443 B1 | 1/2001 | Lin |
| 6,182,212 B1 | 1/2001 | Atkins et al. |
| 6,188,399 B1 | 2/2001 | Voas et al. |
| 6,191,797 B1 | 2/2001 | Politis |
| 6,195,664 B1 | 2/2001 | Tolfa |
| 6,211,890 B1 | 4/2001 | Ohba |
| 6,216,141 B1 | 4/2001 | Straub et al. |
| 6,232,957 B1 | 5/2001 | Hinckley |
| 6,236,396 B1 | 5/2001 | Jenson et al. |
| 6,243,705 B1 | 6/2001 | Kucala |
| 6,246,418 B1 | 6/2001 | Oka |
| 6,253,122 B1 | 6/2001 | Razavi et al. |
| 6,259,432 B1 | 7/2001 | Yamada et al. |
| 6,266,053 B1 | 7/2001 | French et al. |
| 6,266,098 B1 | 7/2001 | Cove et al. |
| 6,266,430 B1 | 7/2001 | Rhoads |
| 6,269,405 B1 | 7/2001 | Dutcher et al. |
| 6,272,484 B1 | 8/2001 | Martin et al. |
| 6,272,558 B1 | 8/2001 | Hui et al. |
| 6,275,449 B1 | 8/2001 | Wang |
| 6,275,831 B1 | 8/2001 | Bodnar et al. |
| 6,278,448 B1 | 8/2001 | Brown et al. |
| 6,278,450 B1 | 8/2001 | Arcuri et al. |
| 6,282,711 B1 | 8/2001 | Halpern et al. |
| 6,285,374 B1 | 9/2001 | Falcon |
| 6,295,541 B1 | 9/2001 | Bodnar et al. |
| 6,300,947 B1 | 10/2001 | Kanevsky |
| 6,304,684 B1 | 10/2001 | Niczyporuk et al. |
| 6,307,574 B1 | 10/2001 | Ashe et al. |
| 6,310,621 B1 | 10/2001 | Gagne et al. |
| 6,311,232 B1 | 10/2001 | Cagle et al. |
| 6,313,851 B1 | 11/2001 | Matthews, III et al. |
| 6,321,314 B1 | 11/2001 | Van Dyke |
| 6,326,978 B1 | 12/2001 | Robbins |
| 6,330,618 B1 | 12/2001 | Hawkins et al. |
| 6,333,753 B1 | 12/2001 | Hinckley |
| 6,339,826 B2 | 1/2002 | Hayes, Jr. et al. |
| 6,344,855 B1 | 2/2002 | Fisher et al. |
| 6,353,437 B1 | 3/2002 | Gagne |
| 6,363,404 B1 | 3/2002 | Dalal et al. |
| 6,369,823 B2 | 4/2002 | Ohba |

(56) References Cited

U.S. PATENT DOCUMENTS

| | | |
|---|---|---|
| 6,369,830 B1 | 4/2002 | Brunner et al. |
| 6,385,466 B1 | 5/2002 | Hirai et al. |
| 6,396,520 B1 | 5/2002 | Ording |
| 6,401,104 B1 | 6/2002 | Larue et al. |
| 6,411,274 B2 | 6/2002 | Watanabe et al. |
| 6,411,301 B1 | 6/2002 | Parikh et al. |
| 6,412,021 B1 | 6/2002 | Nguyen et al. |
| 6,421,058 B2 | 7/2002 | Parikh et al. |
| 6,424,348 B2 | 7/2002 | Parikh et al. |
| 6,429,903 B1 | 8/2002 | Young |
| 6,430,576 B1 | 8/2002 | Gates et al. |
| 6,434,447 B1 | 8/2002 | Shteyn |
| 6,434,744 B1 | 8/2002 | Chamberlain et al. |
| 6,446,260 B1 | 9/2002 | Wilde et al. |
| 6,452,600 B1 | 9/2002 | Parikh et al. |
| 6,456,290 B2 | 9/2002 | Parikh et al. |
| 6,457,034 B1 | 9/2002 | Morein |
| 6,466,218 B2 | 10/2002 | Parikh et al. |
| 6,466,237 B1 | 10/2002 | Miyao et al. |
| 6,467,205 B1 | 10/2002 | Flagg et al. |
| 6,469,714 B2 | 10/2002 | Buxton et al. |
| 6,483,524 B1 | 11/2002 | Petchenkine et al. |
| 6,484,261 B1 | 11/2002 | Wiegel |
| 6,486,895 B1 | 11/2002 | Robertson et al. |
| 6,487,560 B1 | 11/2002 | LaRue et al. |
| 6,489,963 B2 | 12/2002 | Parikh et al. |
| 6,493,733 B1 | 12/2002 | Pollack et al. |
| 6,512,522 B1 | 1/2003 | Miller et al. |
| 6,515,682 B1 | 2/2003 | Washington et al. |
| 6,519,601 B1 | 2/2003 | Bosch |
| 6,522,347 B1 | 2/2003 | Tsuji et al. |
| 6,522,990 B1 | 2/2003 | Rains et al. |
| 6,525,736 B1 | 2/2003 | Erikawa et al. |
| 6,526,174 B1 | 2/2003 | Graffagnino |
| 6,535,892 B1 | 3/2003 | Larue et al. |
| 6,536,041 B1 | 3/2003 | Knudson et al. |
| 6,542,160 B1 | 4/2003 | Abgrall |
| 6,542,166 B1 | 4/2003 | Washington et al. |
| 6,544,295 B1 | 4/2003 | Bodnar |
| 6,567,854 B1 | 5/2003 | Olshansky et al. |
| 6,571,245 B2 | 5/2003 | Huang et al. |
| 6,571,328 B2 | 5/2003 | Liao et al. |
| 6,573,896 B1 | 6/2003 | Ribadeau Dumas et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,593,942 B1 | 7/2003 | Bushmitch et al. |
| 6,597,358 B2 | 7/2003 | Miller |
| 6,601,988 B2 | 8/2003 | Molander |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,621,509 B1 | 9/2003 | Eiref et al. |
| 6,628,310 B1 | 9/2003 | Hiura et al. |
| 6,633,315 B1 | 10/2003 | Sobeski et al. |
| 6,636,214 B1 | 10/2003 | Leather et al. |
| 6,639,595 B1 | 10/2003 | Drebin et al. |
| 6,644,046 B2 | 11/2003 | Roh et al. |
| 6,645,070 B2 | 11/2003 | Lupo |
| 6,647,370 B1 | 11/2003 | Fu et al. |
| 6,661,426 B1 | 12/2003 | Jetha et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,675,230 B1 | 1/2004 | Lewallen |
| 6,687,745 B1 | 2/2004 | Franco et al. |
| 6,697,074 B2 | 2/2004 | Parikh et al. |
| 6,707,462 B1 | 3/2004 | Peercy et al. |
| 6,710,788 B1 | 3/2004 | Freach et al. |
| 6,710,790 B1 | 3/2004 | Fagioli |
| 6,714,201 B1 | 3/2004 | Grinstein et al. |
| 6,714,221 B1 | 3/2004 | Christie et al. |
| 6,715,053 B1 | 3/2004 | Grigor |
| 6,717,599 B1 | 4/2004 | Olano |
| 6,724,403 B1 | 4/2004 | Santoro et al. |
| 6,734,864 B2 | 5/2004 | Abgrall |
| 6,738,804 B1 | 5/2004 | vazquez et al. |
| 6,741,242 B1 | 5/2004 | Itoh et al. |
| 6,742,042 B1 | 5/2004 | Holden et al. |
| 6,757,691 B1 | 6/2004 | Welsh et al. |
| 6,757,698 B2 | 6/2004 | McBride et al. |
| 6,760,046 B2 | 7/2004 | I'Anson et al. |
| 6,760,748 B1 | 7/2004 | Hakim |
| 6,765,592 B1 | 7/2004 | Pletcher et al. |
| 6,774,914 B1 | 8/2004 | Benayoun |
| 6,788,318 B2 | 9/2004 | Chen |
| 6,792,616 B1 | 9/2004 | Jerding et al. |
| 6,795,060 B2 | 9/2004 | Rekimoto et al. |
| 6,801,224 B1 | 10/2004 | Lewallen |
| 6,806,892 B1 | 10/2004 | Plow et al. |
| 6,819,343 B1 | 11/2004 | Sobeski et al. |
| 6,832,263 B2 | 12/2004 | Polizzi et al. |
| 6,850,808 B2 | 2/2005 | Yuen et al. |
| 6,880,132 B2 | 4/2005 | Uemura |
| 6,882,979 B1 | 4/2005 | Reay et al. |
| 6,892,360 B1 | 5/2005 | Pabla et al. |
| 6,906,720 B2 | 6/2005 | Emberling et al. |
| 6,910,000 B1 | 6/2005 | Yedidia et al. |
| 6,910,052 B2 | 6/2005 | Gates et al. |
| 6,911,984 B2 | 6/2005 | Sabella et al. |
| 6,912,532 B2 | 6/2005 | Andersen |
| 6,918,091 B2 | 7/2005 | Leavitt et al. |
| 6,925,477 B1 | 8/2005 | Champagne et al. |
| 6,926,199 B2 | 8/2005 | Jay et al. |
| 6,931,633 B1 | 8/2005 | Vazquez et al. |
| 6,938,218 B1 | 8/2005 | Rosen |
| 6,944,829 B2 | 9/2005 | Dando |
| 6,963,908 B1 | 11/2005 | Lynch et al. |
| 6,993,721 B2 | 1/2006 | Rosin et al. |
| 7,007,041 B2 | 2/2006 | Multer et al. |
| 7,007,242 B2 | 2/2006 | Suomela et al. |
| 7,016,011 B2 | 3/2006 | De Haan |
| 7,024,381 B1 | 4/2006 | Hastings et al. |
| 7,027,055 B2 | 4/2006 | Anderson et al. |
| 7,028,264 B2 | 4/2006 | Santoro et al. |
| 7,030,890 B1 | 4/2006 | Jouet et al. |
| 7,036,083 B1 | 4/2006 | Zenith |
| 7,050,955 B1 | 5/2006 | Carmel et al. |
| 7,065,718 B2 | 6/2006 | Lection |
| 7,076,730 B1 | 7/2006 | Baker |
| 7,082,577 B1 | 7/2006 | Brosnahan |
| 7,085,994 B2 | 8/2006 | Gvily |
| 7,107,546 B2 | 9/2006 | Coulthard |
| 7,127,473 B2 | 10/2006 | Agassi et al. |
| 7,127,509 B2 | 10/2006 | Wu |
| 7,127,713 B2 | 10/2006 | Davis et al. |
| 7,134,095 B1 | 11/2006 | Smith et al. |
| 7,146,563 B2 | 12/2006 | Hesmer et al. |
| 7,162,628 B2 | 1/2007 | Gentil et al. |
| 7,170,510 B2 | 1/2007 | Kawahara et al. |
| 7,174,512 B2 | 2/2007 | Martin et al. |
| 7,177,915 B2 | 2/2007 | Kopchik |
| 7,185,290 B2 | 2/2007 | Cadiz et al. |
| 7,191,399 B2 | 3/2007 | Ohtani et al. |
| 7,194,743 B2 | 3/2007 | Hayton et al. |
| 7,216,305 B1 | 5/2007 | Jaeger |
| 7,216,351 B1 | 5/2007 | Maes |
| 7,218,575 B2 | 5/2007 | Rosevear |
| 7,222,155 B1 | 5/2007 | Gebhardt et al. |
| 7,242,406 B2 | 7/2007 | Robotham et al. |
| 7,245,310 B2 | 7/2007 | Kawahara et al. |
| 7,249,327 B2 | 7/2007 | Nelson et al. |
| 7,260,380 B2 | 8/2007 | Dietl et al. |
| 7,269,792 B2 | 9/2007 | Consolatti et al. |
| 7,278,112 B2 | 10/2007 | Numano |
| 7,281,202 B2 | 10/2007 | Croney et al. |
| 7,293,034 B2 | 11/2007 | Paya et al. |
| 7,293,070 B2 | 11/2007 | Moses et al. |
| 7,305,491 B2 | 12/2007 | Miller et al. |
| 7,315,848 B2 | 1/2008 | Pearse et al. |
| 7,328,435 B2 | 2/2008 | Trifon |
| 7,346,373 B2 | 3/2008 | Kim |
| 7,346,766 B2 | 3/2008 | Mackin et al. |

(56) References Cited

U.S. PATENT DOCUMENTS

| | | |
|---|---|---|
| 7,353,234 B2 | 4/2008 | Kimball et al. |
| 7,353,465 B2 | 4/2008 | Callaway et al. |
| 7,356,816 B2 | 4/2008 | Goodman et al. |
| 7,392,483 B2 | 6/2008 | Wong et al. |
| 7,401,104 B2 | 7/2008 | Shah et al. |
| 7,426,687 B1 | 9/2008 | Schultz et al. |
| 7,434,177 B1 | 10/2008 | Ording et al. |
| 7,437,485 B1 | 10/2008 | Kruglikov et al. |
| 7,441,108 B2 | 10/2008 | Fisher et al. |
| 7,472,350 B2 | 12/2008 | Hintermeister et al. |
| 7,478,326 B2 | 1/2009 | Holecek et al. |
| 7,480,873 B2 | 1/2009 | Kawahara |
| 7,487,467 B1 | 2/2009 | Kawahara et al. |
| 7,490,295 B2 | 2/2009 | Chaudhri et al. |
| 7,502,838 B2 | 3/2009 | Franco et al. |
| 7,503,010 B2 | 3/2009 | Chaudhri et al. |
| 7,516,158 B2 | 4/2009 | Drukman et al. |
| 7,523,401 B1 | 4/2009 | Aldridge |
| 7,530,026 B2 | 5/2009 | Chaudhri et al. |
| 7,536,647 B2 | 5/2009 | Walker et al. |
| 7,543,245 B2 | 6/2009 | Irimajiri |
| 7,546,543 B2 | 6/2009 | Louch et al. |
| 7,546,554 B2 | 6/2009 | Chin et al. |
| 7,552,397 B2 | 6/2009 | Holecek et al. |
| 7,568,165 B2 | 7/2009 | Amadio et al. |
| 7,590,995 B2 | 9/2009 | Nakamura et al. |
| 7,613,834 B1 | 11/2009 | Pallipuram et al. |
| 7,614,011 B2 | 11/2009 | Karidis et al. |
| 7,644,391 B2 | 1/2010 | Fisher et al. |
| 7,657,837 B2 | 2/2010 | Shappir et al. |
| 7,660,868 B1 | 2/2010 | Kembel et al. |
| 7,665,031 B2 | 2/2010 | Matthews et al. |
| 7,676,483 B2 | 3/2010 | Klug |
| 7,681,112 B1 | 3/2010 | Francis |
| 7,685,515 B2 | 3/2010 | Braud et al. |
| 7,698,658 B2 | 4/2010 | Ohwa et al. |
| 7,707,514 B2 | 4/2010 | Forstall et al. |
| 7,725,839 B2 | 5/2010 | Michaels |
| 7,730,082 B2 | 6/2010 | Sah et al. |
| 7,743,336 B2 | 6/2010 | Louch et al. |
| 7,752,556 B2 | 7/2010 | Forstall et al. |
| 7,756,723 B2 | 7/2010 | Rosow et al. |
| 7,761,800 B2 | 7/2010 | Chaudhri et al. |
| 7,765,326 B2 | 7/2010 | Robbin et al. |
| 7,765,493 B2 | 7/2010 | Chickles et al. |
| 7,774,369 B2 | 8/2010 | Herzog et al. |
| 7,784,065 B2 | 8/2010 | Polivy et al. |
| 7,793,222 B2 | 9/2010 | Chaudhri et al. |
| 7,793,227 B2 | 9/2010 | Wada et al. |
| 7,793,232 B2 | 9/2010 | Chaudhri et al. |
| 7,797,446 B2 | 9/2010 | Heller et al. |
| 7,802,246 B1 | 9/2010 | Kennedy et al. |
| 7,805,494 B1 | 9/2010 | Schwab et al. |
| 7,814,148 B2 | 10/2010 | Bell et al. |
| RE41,922 E | 11/2010 | Gough et al. |
| 7,836,403 B2 | 11/2010 | Viswanathan et al. |
| 7,873,908 B1 | 1/2011 | Varanasi et al. |
| 7,873,910 B2 | 1/2011 | Chaudhri et al. |
| 7,890,324 B2 | 2/2011 | Bangalore et al. |
| 7,895,522 B2 | 2/2011 | Wong et al. |
| 7,925,250 B2 | 4/2011 | Redpath |
| 7,925,976 B2 | 4/2011 | Shin et al. |
| 7,945,855 B2 | 5/2011 | Altman et al. |
| 7,954,064 B2 | 5/2011 | Forstall et al. |
| 7,984,384 B2 | 7/2011 | Chaudhri et al. |
| 7,996,783 B2 | 8/2011 | Ramsey et al. |
| 8,001,476 B2 | 8/2011 | Gallo |
| 8,073,866 B2 | 12/2011 | Eagle et al. |
| 8,108,464 B1 * | 1/2012 | Rochelle ............ G06Q 10/107 709/205 |
| 8,126,774 B2 | 2/2012 | Hendrickson et al. |
| 8,245,027 B2 | 8/2012 | Bear et al. |
| 8,260,353 B2 | 9/2012 | Hugot |
| 8,302,020 B2 | 10/2012 | Louch et al. |
| 8,453,065 B2 | 5/2013 | Chaudhri et al. |
| 8,543,824 B2 | 9/2013 | Louch et al. |
| 8,543,931 B2 | 9/2013 | Forstall et al. |
| 8,566,732 B2 | 10/2013 | Louch et al. |
| 8,667,415 B2 | 3/2014 | Rudolph et al. |
| 9,032,318 B2 | 5/2015 | Louch et al. |
| 9,104,294 B2 | 8/2015 | Forstall et al. |
| 2001/0000667 A1 | 5/2001 | Okawa et al. |
| 2001/0012024 A1 | 8/2001 | Rosin et al. |
| 2001/0015719 A1 | 8/2001 | Van EE et al. |
| 2001/0017632 A1 | 8/2001 | Goren-Bar |
| 2001/0019338 A1 | 9/2001 | Roth |
| 2001/0030647 A1 | 10/2001 | Sowizral et al. |
| 2001/0035885 A1 | 11/2001 | Iron et al. |
| 2001/0040571 A1 | 11/2001 | Miller |
| 2002/0011446 A1 | 1/2002 | Lundquist |
| 2002/0013822 A1 | 1/2002 | West |
| 2002/0013832 A1 | 1/2002 | Hubbard |
| 2002/0026474 A1 | 2/2002 | Wang et al. |
| 2002/0049788 A1 | 4/2002 | Lipkin et al. |
| 2002/0054148 A1 | 5/2002 | Okada |
| 2002/0054541 A1 | 5/2002 | Hall |
| 2002/0059594 A1 | 5/2002 | Rasmussen et al. |
| 2002/0065946 A1 | 5/2002 | Narayan |
| 2002/0065949 A1 | 5/2002 | Heaton |
| 2002/0066279 A1 | 6/2002 | Kiyomatsu |
| 2002/0067376 A1 | 6/2002 | Martin et al. |
| 2002/0067378 A1 | 6/2002 | Abdelhadi et al. |
| 2002/0067418 A1 | 6/2002 | I |
| 2002/0078255 A1 | 6/2002 | Narayan |
| 2002/0078453 A1 | 6/2002 | Kuo |
| 2002/0085037 A1 | 7/2002 | Leavitt et al. |
| 2002/0087632 A1 | 7/2002 | Keskar |
| 2002/0089526 A1 | 7/2002 | Buxton et al. |
| 2002/0091697 A1 | 7/2002 | Huang et al. |
| 2002/0093516 A1 | 7/2002 | Brunner et al. |
| 2002/0095663 A1 | 7/2002 | Joory |
| 2002/0099678 A1 | 7/2002 | Albright et al. |
| 2002/0104080 A1 | 8/2002 | Woodard et al. |
| 2002/0105548 A1 | 8/2002 | Hayton et al. |
| 2002/0111934 A1 | 8/2002 | Narayan |
| 2002/0111972 A1 | 8/2002 | Lynch et al. |
| 2002/0112180 A1 | 8/2002 | Land et al. |
| 2002/0114466 A1 | 8/2002 | Tanaka et al. |
| 2002/0118217 A1 | 8/2002 | Fujiki |
| 2002/0118223 A1 | 8/2002 | Steichen et al. |
| 2002/0120673 A1 | 8/2002 | Tolson et al. |
| 2002/0129092 A1 | 9/2002 | Tolson et al. |
| 2002/0130900 A1 | 9/2002 | Davis |
| 2002/0133508 A1 | 9/2002 | Larue et al. |
| 2002/0140740 A1 | 10/2002 | Chen |
| 2002/0140746 A1 | 10/2002 | Gargi |
| 2002/0147782 A1 | 10/2002 | Dimitrova et al. |
| 2002/0147912 A1 | 10/2002 | Shmueli et al. |
| 2002/0152098 A1 | 10/2002 | Evans et al. |
| 2002/0152279 A1 | 10/2002 | Sollenberger et al. |
| 2002/0156798 A1 | 10/2002 | LaRue et al. |
| 2002/0158902 A1 | 10/2002 | Hooker et al. |
| 2002/0171682 A1 | 11/2002 | Frank et al. |
| 2002/0174003 A1 | 11/2002 | Redmann et al. |
| 2002/0174055 A1 | 11/2002 | Dick et al. |
| 2002/0174181 A1 | 11/2002 | Wei |
| 2002/0180798 A1 | 12/2002 | Poor et al. |
| 2002/0186257 A1 | 12/2002 | Cadiz et al. |
| 2002/0194090 A1 | 12/2002 | Gagnon et al. |
| 2002/0196268 A1 | 12/2002 | Wolff et al. |
| 2003/0008661 A1 | 1/2003 | Joyce et al. |
| 2003/0008711 A1 | 1/2003 | Corbo |
| 2003/0009267 A1 | 1/2003 | Dunsky et al. |
| 2003/0011646 A1 | 1/2003 | Levine et al. |
| 2003/0018971 A1 | 1/2003 | McKenna, Jr. |
| 2003/0020671 A1 | 1/2003 | Santoro et al. |
| 2003/0032409 A1 | 2/2003 | Hutcheson et al. |
| 2003/0046316 A1 | 3/2003 | Gergic et al. |
| 2003/0061482 A1 | 3/2003 | Emmerichs |
| 2003/0065715 A1 | 4/2003 | Burdick, Jr. et al. |
| 2003/0067489 A1 | 4/2003 | Wong et al. |
| 2003/0069904 A1 | 4/2003 | Hsu et al. |
| 2003/0076369 A1 | 4/2003 | Resner et al. |
| 2003/0079038 A1 | 4/2003 | Robbin et al. |

(56) References Cited

U.S. PATENT DOCUMENTS

| | | |
|---|---|---|
| 2003/0080995 A1 | 5/2003 | Tenenbaum et al. |
| 2003/0097659 A1 | 5/2003 | Goldman |
| 2003/0140044 A1 | 7/2003 | Mok et al. |
| 2003/0142136 A1 | 7/2003 | Carter et al. |
| 2003/0146934 A1 | 8/2003 | Bailey et al. |
| 2003/0154239 A1 | 8/2003 | Davis et al. |
| 2003/0158975 A1 | 8/2003 | Frank et al. |
| 2003/0159028 A1 | 8/2003 | Mackin et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0184552 A1 | 10/2003 | Chadha |
| 2003/0184584 A1 | 10/2003 | Vachuska et al. |
| 2003/0189597 A1 | 10/2003 | Anderson et al. |
| 2003/0191799 A1 | 10/2003 | Araujo et al. |
| 2003/0206195 A1 | 11/2003 | Matsa et al. |
| 2003/0208685 A1 | 11/2003 | Abdel-Rahman |
| 2004/0003402 A1 | 1/2004 | McKenna, Jr. |
| 2004/0012626 A1 | 1/2004 | Brookins |
| 2004/0015942 A1 | 1/2004 | Branson et al. |
| 2004/0019645 A1* | 1/2004 | Goodman ............ H04L 67/02 709/206 |
| 2004/0024616 A1 | 2/2004 | Spector et al. |
| 2004/0032409 A1 | 2/2004 | Girard |
| 2004/0036711 A1 | 2/2004 | Anderson |
| 2004/0039934 A1 | 2/2004 | Land et al. |
| 2004/0054711 A1 | 3/2004 | Multer |
| 2004/0056900 A1 | 3/2004 | Blume |
| 2004/0070629 A1 | 4/2004 | Seifert |
| 2004/0078814 A1 | 4/2004 | Allen |
| 2004/0090969 A1 | 5/2004 | Jerrard-Dunne et al. |
| 2004/0117831 A1 | 6/2004 | Ellis et al. |
| 2004/0119754 A1 | 6/2004 | Bangalore et al. |
| 2004/0125128 A1 | 7/2004 | Chang et al. |
| 2004/0141016 A1 | 7/2004 | Fukatsu et al. |
| 2004/0142711 A1 | 7/2004 | Mahonen et al. |
| 2004/0165008 A1 | 8/2004 | Levine et al. |
| 2004/0179019 A1 | 9/2004 | Sabella et al. |
| 2004/0181580 A1 | 9/2004 | Baranshamaje |
| 2004/0183800 A1 | 9/2004 | Peterson |
| 2004/0194020 A1 | 9/2004 | Beda et al. |
| 2004/0199541 A1 | 10/2004 | Goldberg et al. |
| 2004/0199543 A1 | 10/2004 | Braud et al. |
| 2004/0199574 A1 | 10/2004 | Franco et al. |
| 2004/0203684 A1 | 10/2004 | Jokinen et al. |
| 2004/0204963 A1 | 10/2004 | Klueh et al. |
| 2004/0205504 A1 | 10/2004 | Phillips |
| 2004/0212640 A1 | 10/2004 | Mann et al. |
| 2004/0215740 A1 | 10/2004 | Frank et al. |
| 2004/0216054 A1 | 10/2004 | Mathews et al. |
| 2004/0223003 A1 | 11/2004 | Heirich et al. |
| 2004/0225955 A1 | 11/2004 | Ly |
| 2004/0230911 A1 | 11/2004 | Bent et al. |
| 2004/0237082 A1 | 11/2004 | Alcazar et al. |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010419 A1 | 1/2005 | Pourhamid |
| 2005/0010634 A1 | 1/2005 | Henderson et al. |
| 2005/0021756 A1 | 1/2005 | Grant |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0050539 A1 | 3/2005 | Burkhardt et al. |
| 2005/0057497 A1 | 3/2005 | Kawahara |
| 2005/0060193 A1 | 3/2005 | Lancaster et al. |
| 2005/0060655 A1 | 3/2005 | Gray et al. |
| 2005/0060661 A1 | 3/2005 | Kawahara et al. |
| 2005/0076305 A1 | 4/2005 | Hintermeister et al. |
| 2005/0076321 A1 | 4/2005 | Smith |
| 2005/0085272 A1 | 4/2005 | Anderson et al. |
| 2005/0088447 A1 | 4/2005 | Hanggie et al. |
| 2005/0088452 A1 | 4/2005 | Hanggie et al. |
| 2005/0091571 A1 | 4/2005 | Leichtling |
| 2005/0091690 A1 | 4/2005 | Delpuch et al. |
| 2005/0093868 A1 | 5/2005 | Hinckley |
| 2005/0114021 A1 | 5/2005 | Krall et al. |
| 2005/0114778 A1 | 5/2005 | Branson et al. |
| 2005/0125787 A1 | 6/2005 | Tertitski et al. |
| 2005/0144563 A1 | 6/2005 | Hough et al. |
| 2005/0144595 A1 | 6/2005 | McLean |
| 2005/0149458 A1 | 7/2005 | Eglen et al. |
| 2005/0149852 A1 | 7/2005 | Bleicher et al. |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0172239 A1 | 8/2005 | Liu et al. |
| 2005/0183026 A1 | 8/2005 | Amano et al. |
| 2005/0193368 A1 | 9/2005 | Becker et al. |
| 2005/0198584 A1 | 9/2005 | Matthews et al. |
| 2005/0215310 A1 | 9/2005 | Boyd et al. |
| 2005/0221808 A1 | 10/2005 | Karlsson et al. |
| 2005/0229118 A1 | 10/2005 | Chiu et al. |
| 2005/0234884 A1 | 10/2005 | Drukman et al. |
| 2005/0240857 A1 | 10/2005 | Benedict et al. |
| 2005/0243373 A1 | 11/2005 | Silverbrook et al. |
| 2005/0256940 A1 | 11/2005 | Henderson et al. |
| 2005/0257167 A1 | 11/2005 | Fraleigh, Jr. et al. |
| 2005/0270274 A1 | 12/2005 | Bachmann |
| 2005/0278651 A1 | 12/2005 | Coe et al. |
| 2005/0282612 A1 | 12/2005 | Mathews |
| 2005/0283734 A1 | 12/2005 | Santoro et al. |
| 2006/0001652 A1 | 1/2006 | Chiu et al. |
| 2006/0004913 A1 | 1/2006 | Chong |
| 2006/0005207 A1 | 1/2006 | Louch et al. |
| 2006/0007875 A1 | 1/2006 | Andersen |
| 2006/0010394 A1 | 1/2006 | Chaudhri et al. |
| 2006/0015818 A1 | 1/2006 | Chaudhri et al. |
| 2006/0015846 A1 | 1/2006 | Fraleigh et al. |
| 2006/0018207 A1 | 1/2006 | Saito |
| 2006/0020898 A1 | 1/2006 | Kim et al. |
| 2006/0031264 A1 | 2/2006 | Bosworth et al. |
| 2006/0031587 A1 | 2/2006 | Paterson et al. |
| 2006/0036692 A1* | 2/2006 | Morinigo ............ G06Q 10/107 709/206 |
| 2006/0036703 A1 | 2/2006 | Fulmer et al. |
| 2006/0036941 A1 | 2/2006 | Neil |
| 2006/0036969 A1 | 2/2006 | Guido et al. |
| 2006/0041879 A1 | 2/2006 | Bower et al. |
| 2006/0048073 A1 | 3/2006 | Jarrett et al. |
| 2006/0053384 A1 | 3/2006 | La Fetra et al. |
| 2006/0055789 A1 | 3/2006 | Jin et al. |
| 2006/0059437 A1 | 3/2006 | Conklin |
| 2006/0064422 A1 | 3/2006 | Arthurs et al. |
| 2006/0075033 A1 | 4/2006 | Bienstock et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0095331 A1 | 5/2006 | O'Malley et al. |
| 2006/0107229 A1 | 5/2006 | Matthews et al. |
| 2006/0107231 A1 | 5/2006 | Matthews et al. |
| 2006/0111156 A1 | 5/2006 | Choi et al. |
| 2006/0112123 A1 | 5/2006 | Clark et al. |
| 2006/0123353 A1 | 6/2006 | Matthews et al. |
| 2006/0123356 A1 | 6/2006 | Sobeski et al. |
| 2006/0123359 A1 | 6/2006 | Schatzberger et al. |
| 2006/0136843 A1 | 6/2006 | Shafron |
| 2006/0150118 A1 | 7/2006 | Chaudhri et al. |
| 2006/0154649 A1 | 7/2006 | Pedersen et al. |
| 2006/0156228 A1 | 7/2006 | Gallo et al. |
| 2006/0156248 A1 | 7/2006 | Chaudhri et al. |
| 2006/0167704 A1 | 7/2006 | Nicholls et al. |
| 2006/0168536 A1 | 7/2006 | Portmann |
| 2006/0168538 A1 | 7/2006 | Stevens et al. |
| 2006/0174202 A1 | 8/2006 | Bonner |
| 2006/0184540 A1 | 8/2006 | Kung et al. |
| 2006/0197752 A1 | 9/2006 | Hurst et al. |
| 2006/0200775 A1 | 9/2006 | Behr et al. |
| 2006/0205517 A1 | 9/2006 | Malabuyo et al. |
| 2006/0206835 A1 | 9/2006 | Chaudhri et al. |
| 2006/0218499 A1 | 9/2006 | Matthews et al. |
| 2006/0230059 A1 | 10/2006 | Etgen et al. |

(56) References Cited

U.S. PATENT DOCUMENTS

| | | | |
|---|---|---|---|
| 2006/0230272 A1 | 10/2006 | Lawrence et al. |
| 2006/0236257 A1 | 10/2006 | Othmer et al. |
| 2006/0248471 A1 | 11/2006 | Lindsay et al. |
| 2006/0253794 A1 | 11/2006 | Wilson |
| 2006/0271637 A1 | 11/2006 | McKeon et al. |
| 2006/0274086 A1 | 12/2006 | Forstall et al. |
| 2006/0277469 A1 | 12/2006 | Chaudhri et al. |
| 2006/0277481 A1 | 12/2006 | Forstall et al. |
| 2006/0282574 A1 | 12/2006 | Zotov et al. |
| 2007/0010942 A1 | 1/2007 | Bill et al. |
| 2007/0011026 A1 | 1/2007 | Higgins et al. |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0074126 A1 | 3/2007 | Fisher et al. |
| 2007/0078953 A1 | 4/2007 | Chai et al. |
| 2007/0097115 A1 | 5/2007 | Ok et al. |
| 2007/0101146 A1 | 5/2007 | Louch et al. |
| 2007/0101279 A1 | 5/2007 | Chaudhri et al. |
| 2007/0101288 A1 | 5/2007 | Forstall et al. |
| 2007/0101291 A1 | 5/2007 | Forstall |
| 2007/0101297 A1 | 5/2007 | Forstall et al. |
| 2007/0101433 A1 | 5/2007 | Forstall et al. |
| 2007/0112739 A1 | 5/2007 | Burns et al. |
| 2007/0118813 A1 | 5/2007 | Forstall et al. |
| 2007/0129888 A1 | 6/2007 | Rosenberg |
| 2007/0130523 A1 | 6/2007 | Ku et al. |
| 2007/0130541 A1 | 6/2007 | Louch et al. |
| 2007/0157119 A1 | 7/2007 | Bishop |
| 2007/0162850 A1 | 7/2007 | Adler et al. |
| 2007/0168875 A1 | 7/2007 | Kowitz et al. |
| 2007/0198946 A1 | 8/2007 | Viji et al. |
| 2007/0203984 A2 | 8/2007 | AlHusseini et al. |
| 2007/0209013 A1 | 9/2007 | Ramsey et al. |
| 2007/0233736 A1 | 10/2007 | Xiong et al. |
| 2007/0243852 A1 | 10/2007 | Gibbs |
| 2007/0261001 A1 | 11/2007 | Nagiyama et al. |
| 2007/0266093 A1 | 11/2007 | Forstall et al. |
| 2007/0273558 A1 | 11/2007 | Smith et al. |
| 2008/0016468 A1 | 1/2008 | Chambers et al. |
| 2008/0126937 A1 | 5/2008 | Pachet |
| 2008/0155453 A1 | 6/2008 | Othmer |
| 2008/0256479 A1 | 10/2008 | Hemmings |
| 2008/0288578 A1 | 11/2008 | Silverberg |
| 2009/0077493 A1 | 3/2009 | Hempel et al. |
| 2009/0094514 A1* | 4/2009 | Dargahi ............ G06F 17/30861 715/255 |
| 2009/0100368 A1 | 4/2009 | Look et al. |
| 2009/0119127 A2 | 5/2009 | Rosow et al. |
| 2009/0125815 A1 | 5/2009 | Chaudhri et al. |
| 2009/0144644 A1 | 6/2009 | Chaudhri et al. |
| 2009/0158193 A1 | 6/2009 | Chaudhri et al. |
| 2009/0187841 A1 | 7/2009 | Chaudhri et al. |
| 2009/0228824 A1 | 9/2009 | Forstall et al. |
| 2009/0260022 A1 | 10/2009 | Louch et al. |
| 2009/0271724 A1 | 10/2009 | Chaudhri et al. |
| 2010/0077338 A1 | 3/2010 | Matthews et al. |
| 2010/0211886 A1 | 8/2010 | Forstall et al. |
| 2010/0229095 A1 | 9/2010 | Forstall et al. |
| 2010/0242110 A1 | 9/2010 | Louch et al. |
| 2011/0099487 A1 | 4/2011 | Phyalammi et al. |
| 2011/0231790 A1 | 9/2011 | Forstall et al. |
| 2013/0125007 A1 | 5/2013 | Chaudhri et al. |
| 2014/0026090 A1 | 1/2014 | Chaudhri et al. |

FOREIGN PATENT DOCUMENTS

| | | |
|---|---|---|
| EP | 0 548 586 | 6/1993 |
| EP | 0 908 835 | 4/1999 |
| EP | 1 237 076 | 9/2002 |
| EP | 1 383 080 | 1/2004 |
| EP | 0 972 273 | 3/2004 |
| EP | 0 694 879 | 11/2005 |
| EP | 1 724 996 | 11/2006 |
| JP | 4214595 | 8/1992 |
| JP | 05-210477 | 8/1993 |
| JP | 8-211167 | 8/1996 |
| WO | WO 1996/06401 | 2/1996 |
| WO | WO 1997/07467 | 2/1997 |
| WO | WO 1998/07112 | 2/1998 |
| WO | WO 1998/45815 | 10/1998 |
| WO | WO 2001/46790 | 6/2001 |
| WO | WO 2002/09039 | 1/2002 |
| WO | WO 2002/25382 | 3/2002 |
| WO | WO 2003/023593 | 3/2003 |
| WO | WO 2003/102817 | 12/2003 |
| WO | WO 2004/23294 | 3/2004 |
| WO | WO 2004/027707 | 4/2004 |
| WO | WO 2004/076977 | 9/2004 |
| WO | WO 2006/012343 | 2/2006 |
| WO | WO 2006/020304 | 2/2006 |
| WO | WO 2006/119269 | 11/2006 |
| WO | WO 2009/012319 | 1/2009 |
| WO | WO 2009/012330 | 1/2009 |

OTHER PUBLICATIONS

"Dashboard Blog," Dec. 11, 2003, [online] [Retrieved from the Internet on May 11, 2007], URL: http://www.nat.org/dashboard/blog.php3, 31 pages.

"GPS Blogging Phones"; [online] [Retrieved on Apr. 5, 2006], Retrieved from the Internet at URL: http://www.dailywireless.org/modules.php?name=News&file=article&sid=4613, 3 pages.

"Portlet Communication: What is application scope, anyway?", Sep. 18, 2002, [online]; Retrieved from the Internet at URL: http://www.coderanch.com/t/203244/Portals-Porlets/java/Portlet-Communications-What-application-scope, 3 pages.

"Portlet-to-portlet communication between JSR 168 portlets on public pages", Apr. 5, 2006, [online]; Retrieved from the Internet URL: http://www.ibm.developerworks/websphere/library/techarticles/0604_scott.html, 9 pages.

"Snippets Software Platform," Snippet Software Inc., Jun. 2001, [online] [Retrieved on Jun. 11, 2001] Retrieved from the Internet <URL: http://www.snippets.com/products/>.

"Welcome to the Gigaplex!™" Lazar Productions, Nov. 1996, [online] [Retrieved on Dec. 8, 2008]; Retrieved from the Internet URL: http://web.archive.org/web/19961105081827/www.gigaplex.com/, 4 pages.

"Welcome to the Land of Mirrors," Open Enterprise Magazine, Mar. 1, 2004, pp. 82-85, vol. 2, No. 3, (With Partial English Translation).

"Convert just about Anything to Anything else", Online Conversion. com, [online] [Retrieved on Jun. 22, 2008]; Retrieved from the Internet, URL: http://web.archive.org/web/20000815055422/http://www.onlineconversion.com, 2 pages.

"Objects, Images and Applets," [online] [Archived by http://archivve.org; Retrieved on Apr. 13, 2006], Retrieved from the Internet URL: http://web.archive.org/web/20030210154019/http://www.w3.org/TR/REC-html140/struct/objects.html, 21 pages.

"Writing a Desk Accessory," Developer Connection, Apple Computer, Inc., Jul. 3, 1996, [online] [Retrieved on May 11, 2009] Retrieved from the Internet URL: http://developer.apple.com/documentation/mac/devices/devices-16.html, 4 pages.

A Better Konspose Background, Aug. 10, 2004, 1 page.

Abel, Todd et. al. Microsoft Office 2000: Create Dynamic Digital Dashboards Using Office, OLAP and DHTML; Jul. 2000, pp. 1-18.

Adam Baratz, Konfabulator 2.0 Before there was Dashboard, there was Konfabulator. While Apple was wokring on . . . , Jun. 22, 2005, 9 pages.

Akeley et al., "Real-Time Graphics Architecture," http://www/graphics.stanford.edu.courses/cs448a-01-fall, the OpenGL® Graphics System, CS448 Lecture 15, Fall 2001, pp. 1-20.

Akeley, "Cg—Teaching Cg," Power Point Presentation, NVIDIA Corporation, Apr. 17, 2003, 19 pages.

Altman, "Visual QuickStart Guide PowerPoint 2000/98, Applying Preset Animations", ProQuest Safari Books, Peachpit Press, May 7, 1999, [online] Retrieved from the Internet: URL: http://proquest.safaribooksonline.com/0201354411, 7 pages.

(56) References Cited

OTHER PUBLICATIONS

BabelFish.com, Inc., Oct. 2003, [online] [Retrieved on Dec. 8, 2008]; Retrieved from the Internet URL: http://web.archive.org/web/20031002115902/www.babelfish.com/en/index.html, 1 page.
Balazs Fejes, "Programming Konfabulator Widgets," Feb. 25, 2006, 5 pages.
Baratz et al., "DesktopX 3/1", Ars Technica, Nov. 17, 2005, [online] [Retrieved on Aug. 1, 2008]; Retrieved from the Internet URL: http://arstechnica.com/reviews/apps/desktopx/ars, 4 pages.
Bauer and Deru, "Motion-Based Adaptation of Information Services for Mobile Users," *Lecture Notes in Computer Science*, Aug. 19, 2005, Retrieved from the Internet, URL: http://www.springerlink.com/content/lwdvxw9ervxa44f9/fulltext.pdf>, [retrieved on Sep. 15, 2009], 6 pages.
Bauer, "Transparent User Modeling for a Mobile Personal Assistant," *LWA 2004: Lernen-Wissensentdecking-Adaptivitat*, [Online] Oct. 6, 2004 (Oct. 6, 2004), pp. 3-8, Berlin Retrieved from the Internet: URL:http://www.dfki.de/specter/Docs/Bauer04.pdf> [retrieved on Sep. 15, 2009].
Beier et al., "The Bull's-Eye: A Framework for Web Application User Interface Design Guidelines", Proceedings of the Sigchi Conference on Human Factors in Computing Systems, Apr. 2003, pp. 489-496.
Cadiz et al., "Slideshow: Providing Peripheral Awareness of Important Information," Technical Report MSR-TR-2001-83, Microsoft Corporation, Redmond, WA; Sep. 14, 2001; 9 pages.
Carey et al., "Integrating Widget Design Knowledge with User Interface Toolkits", Proceedings of the Fifth International Workshop on Computer-Aided Software Engineering, Jul. 1992, pp. 204-212.
Chen et al., "The Model of Optimum Route Selection in Vehicle Automatic Navigation System Based on Unblocked Reliability Analyses", Intelligent Transportation Systems, 2003, Proceedings, IEEE (2003), vol. 2, Oct. 12-15, 2003, pp. 975-978.
Conner et al. "Three-Dimensional Widgets" ACM 1992, pp. 183-188 and 230-231.
Dashboard vs Konfabulator, Apr. 25, 2005, 31 pages.
Dashboard Widgets, Jun. 8, 2005, 2 pages.
DesktopX 3: Creating a widget, Mar. 6, 2005, 7 pages.
Discovering the Dashboard, Apr. 28, 2005, 10 pages.
eHow, VMWare, http://www.ehow.com/how_6368_minimize-window.html, "How to Minimize a Window," Jun. 2004.
Elliott, "Programming Graphics Processors Functionally," Proceedings of the 2004 Haskell Workshop, Sep. 22, 2004, 11 pages.
Fried, Ina, "Developer Calls Apple's Tiger a copycat," CNET News.com, Jun. 28, 2004 [online] Retrieved on May 6, 2009], Retrieved from the Internet URL: http://news.cnet.com2100-1045_3-5250692.html, 2 pages.
Fried, Ina, "For Apple's Tiger, the kyword is search", CNET News.com, Jun. 28, 2004, [online] [Retrieved on May 5, 2009], Retrieved from the Internet URL: http://archive.org/web20040823135016/http://zdnet.com-com/2102-1103_2-5250346.html, 2 pages.
Gabbard et al., "User-Centered Design and Evaluation of Virtual Environments," Nov./Dec. 1999, IEEE Computer Graphics and Applications, pp. 51-59.
Gruber et al., "Dashboard vs. Konfabulator", Jun. 2004; 10 pages.
Grundy, "An environment for developing adaptive, multi-device user interfaces," *AUIC '03 Proceedings of the Fourth Australasian User Interface Conference on User Interfaces*, 2003, vol. 18, Australian Computer Society, Inc., Darlinghurst, Australia.
Haeberli et al., "The Accumulation Buffer: Hardware Support for High-Quality Rendering," Computer Graphics, Aug. 1990, 24(4):309-318.
Han, "Bi-manual, multi-point, and multi-user interactions on a graphical interaction surface", Multi-Touch Interaction Research; [online] [Retrieved on Apr. 13, 2006]; Retrieved from the Internet, URL: http://mrl.nyu.edu/~jhan/ftirtouch, 4 pages.
Harold R. "Java Network Programming, Second Edition, 2nd edition" O'Reilly & Associates 2000 pp. 1-731 (Cover page and Table of Contents enclosed).

Helal et al., "Drishti: An Integrated Navigation System for Visually Impaired and Disabled", Fifth International Symposium on Wearable Computers (ISWC01), IEEE, 2001, pp. 149-156.
Hide all Widgets on Desktop, Oct. 12, 2004, 5 pages.
Horvitz et al., "The Lumiere Project: Bayesian User Modeling for Inferring the Goals and Needs of Software Users," *Fourteenth Conference on Uncertainty in Artificial Intelligence*, Madison, WI, Jul. 1998, Morgan Kaufman Publishers, pp. 256-265.
How-To Keeping Multiple Dashboard Widgets on the Desktop, Apr. 30, 2005, 8 pages.
International Search Report and the Written Opinion, dated Jan. 27, 2006, issued in International Application No. PCT/US2005/022579; 15 pages.
International Search Report, dated Aug. 8, 2005, issued in International Application PCT/US2005/008805, 3 pages.
International Search Report, dated Jul. 27, 2005, issued in International Application PCT/US2005/008804, 3 pages.
Inter-Widget Messaging!, I want my widgets to work together !, Feb. 7, 2005, 4 pages.
JavaBoutique, [online], Retrieved from the Internet URL: http://javaboutique.internet.com/utilities/counter.html, Oct. 1, 2002, 2 pages.
Javaboutique. Oct. 8, 2008. Available at: http://web.archive.org/web/20021208051951/http://javaboutique.internet.com/utilities.counter.html (may be duplicate of earlier javaboutique reference).
Joyce,"The fabulous Konfabulator: what can it really do?" Dec. 1, 2005, 3 pages.
Kniss et al., "Interactive Volume Rendering Using Multi-Dimensional Transfer Functions and Direct Manipulation Widgets," Oct. 24-26, 2001, 1 page.
Konfabulator 1.7—Now with Konspose and Unicode Support!, Jun. 25, 2004, 11 pages.
Konfabulator Release Notes, Jul. 9, 2004, 3 pages.
Konfabulator, "Cupertino, Start your Photocopiers!," [online] [Retrieved on Jul. 1, 2004]; Retrieved from the Internet URL: http://www.konfabulator.com, 1 page.
Konfabulator, "Konfabulator & Widget Basics—A Refresher Course in Widgetology", [online] [Retrieved on Jun. 5, 2009], Retrieved from the Internet URL: http://web.archive.org/web/20050811020610/http://konfabulator.com/basics; 16 pages.
Konfabulator, "Konfabulator & Widget Basics", [online] [Retrieved on Jul. 1, 2004]; Retrieved from the Internet URL: http://www.konfabulator.com/info/basics.html, 3 pages.
Konfabulator, "Screenshots," [online] [Retrieved on Jul. 1, 2004]; Retrieved from the Internet URL: http://www.konfabulator.com/info/screenshots.html, 2 pages.
Konfabulator, "What is Konfabulator?," [online] [Retrieved on Jul. 1, 2004]; Retrieved from the Internet URL: http://www.konfabulator.com/info/; 3 pages.
Konspose and Activation, Jun. 30, 2004, 2 pages.
Konspose Only—what's the deal?, Oct. 18, 2005, 2 pages.
Konspose Speed, Sep. 24, 2004, 3 pages.
Lammers et al., "Maya 4.5 Fundamentals: Particles", New Riders Publishing, Jan. 14, 2003, [online] [Retrieved on Feb. 17, 2007] Retrieved from the Internet URL: http://proquest.safaribooksonline.com/0735713278, 12 pages.
Lieberman and Selker, "Agents for the User Interface," *Handbook of Agent Technology*, 2003, pp. 1-20, Retrieved from the Internet, URL: http://web.media.mit.edu/{lieber/Publications/Agents_for_UI.pdf> [retrieved on Sep. 15, 2009].
Macworld Unveils Dashboard Widget, Aug. 30, 2005, 5 pages.
Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.
Microsoft Corporation, "User's Guide Microsoft® Windows™ and MS-DOS® 6", 1993, pp. Cover-xvi, 112-121.
Microsoft, "Microsoft Windows XP-Microsoft Word 2003," 2003, 11 pages.
Mizuno, T., "Visiting a Development Environment," Interface Magazine, Jun. 1, 2003, pp. 146-152, vol. 29, No. 6, (With Partial English Translation).

(56) References Cited

OTHER PUBLICATIONS

Movies.com, Jan. 2002, [online] [Retrieved on Dec. 8, 2008]; Retrieved from the Internet URL: http://www.archive.org/web/20020118102516/movies.go.com, 1 page.
Pruder, "Extending Desktop Applications to the Web," Proc Jun. 2004 International Symposium on Information and Communication Technologies, 2004, vol. 90, 6 pages.
Rist et al., "Customizing Graphics for Tiny Displays of Mobile Devices", *Personal and Ubiquitous Computing*, 2002, 6:260-268.
Rochkind et al., "Common Elements in Today's Graphical User Interfaces: The Good, the Bad, and the Ugly," *Interchi '93*, AMC, Apr. 24-29, 1993, pp. 470-473.
Rodriguez et al., "IBM WebSphere Portal V5 A Guide for Portlet Application Development," Feb. 1, 2004, 48 pages.
Scott Collins, "Konfabulator: The Beginning Widget Writer's Guide," Jan. 15, 2006, 28 pages.
Segal et al., "The OpenGL® Graphics System: A Specification (Version 1.5)," © 1992-2003 Silicon Graphics, Inc., Oct. 30, 2003, 333 pages.
Shantzis, "A Model for Efficient and Flexible Image Computing," Computer Graphics Proceedings, Annual Conference Series, Orlando, Florida, Jul. 24-29, 1994, pp. 147-154.
Shiozawa et al., "Perspective Layered Visualization of Collaborative Workspaces," Proceedings of the International ACM SIGGROUP conference on Supporting Group Work Publisher, Nov. 1999, 10 pages.
Silicon Graphics, Inc., "IRIX Interactive Desktop User Interface Guidelines," 2001, Chapter 3, 26 pages.
Siracusa, "Mac OS X 10.4 Tiger: Dashboard", Apr. 28, 2005, [online] [Retrieved on Aug. 1, 2008] Retrieved from the Internet URL: http://arstechnica.com/reviews/os/macosx-10-4.ars/17, 7 pages.
Snippet Software, "Product Spotlight Non-browser based portal solution from Snippets Software," *Corporate Portal Newsletter*, Oct. 2000, 1(10) 3 pages.
Snippet Software, "Snippets Information Delivery Platform," [online] [Retrieved on Jun. 11, 2001]; Retrieved from the Internet URL: http://www.snippets.com/products/; 19 pages.
Snippets Software, "Products Overview," Feb. 2002, [online] [Retrieved on Feb. 5, 2008] Retrieved from the Internet URL: http://web.archive.org/web/20020206061508/http://www.snippets.com/products/, 2 pages.
Staples, "Representation in Virtual Space: Visual Convention in the Graphical User Interface," Proceedings of the SIGCHI Conference on Human Factors in Computing Systems, Apr. 1993 [online] [Retrieved on Dec. 2003] Retrieved from the Internet URL: http://www.nat.org/dashboard/blog.php3 Dec. 2003, 8 pages.
Stardock, "Gallactica Civilization: Dread Lords—User Manual," Stardock Entertainment © 2006; 65 pages.
Stardock, "DesktopX General Guide," Aug. 2000, [online] [Retrieved on Jan. 31, 2008]; Retrieved from the Internet URL:http://www.stardock.com/products/desktopx/docs/; 28 pages.
Stardock, "DesktopX Tutorial," Aug. 2000, [online] [Retrieved on Jan. 31, 2008]; Retrieved from the Internet URL:http://www.stardock.com/products/desktopx/tutorial.html, 40 pages.
Stardock, "DesktopX Whitepaper and users Guide" Retrived from the Internet <URL:http://www.stardock.net/media/whitepaper_desktopx.html>, 1999, 72 pages.
Stardock, "DesktopX WhitePaper," Aug. 2000, [online] [Retrieved on Jan. 31, 2008]; Retrieved from the Internet URL: http://www.stardock.net/media/whitepaper_desktopx.html, 15 pages.
Stardock, "The User Guide—Version 2," DesktopX 2000; 57 pages.
Stardock, "What Can It Do? Making Objects", DesktopX Tutorial, 2001, [online] [Retrieved on Apr. 11, 2008]; Retrieved from the Internet URL: http://web.archive.org/web/20011019222825/http://www.stardock.com/products/desktopx/ . . . ; 6 pages.
Tang et al., "ConNex to Awarenex: Extending Awareness to Mobile Users," SIGCHI '01, AMC, Mar. 31-Apr. 4, 2001, 8 pages.
TellWidget, Sep. 5, 2005, 3 pages.
Thomas et al., "Animating Widgets in the InterViews Toolkit", Lecture Notes in Computer Science, pp. 26-44, 1995.
Ullenboom, "Java is auch eine Insel," 2003, [online] [Retrieved on Apr. 13, 2006]; Retrieved from the Internet URL: http://www.galileocomputing.de/openbook/javainsel12/java_140000.htm#Xxx998138, 3 pages.
Van Gelder et al., "Direct Volume Rendering with Shading via Three-Dimensional Textures," Computer Science Dept., Univ. of California, Santa Cruz, CA 95064, Jul. 19, 1996, 17 pages.
VMware™, "VMware™ Workstation User's Manual, Version 3.2", 2002; cover, pp. 12-13.
Wardell, "Apple's Dashboard vs. Konfabulator vs. DesktopX," Skinning the frog, Jul. 1, 2004, [online] [Retrieved on Aug. 1, 2008]; Retrieved from the Internet URL: http://frogboy.joeuser.com/article/1980, 9 pages.
Wardell, "Konfabulator for Windows", Jan. 10, 2004, [online] [Retrieved on Mar. 6, 2006]; Retrieved from the Internet URL: http://www.xpthemes.com/forums.aps?MID=19&CMID=19&AID=4472, 6 pages.
Warren, "The VMware Workstation 5 Handbook", Jun. 2005, Course Technology PTR, 50 pages.
Web.archive.org et al., "Digital Dashboard," Microsoft.com, published Oct. 24, 2001, 42 pages.
Widget Creation Tutorial, Oct. 30, 2005, 25 pages.
Widget Test Ground, Dec. 1, 2005, 5 pages.
Widgets only when needed, Jul. 8, 2004, 3 pages.
Willett, E., et al., "Microsoft Office 2003 Bible," Chapter 1, Oct. 2, 2003, pp. 1-14, Can be retrieved at <http://mediajohnwiley.com.au/product_data/excerpt/93/07 64 5394/07 64 539493.pdf >.
Wincustomize.com et al. "Currency Widget" 2004 1 page, [online] [Retrieved on Feb. 15, 2010] Retrieved from the internet URL:http://www.wincustomize.com/skins.aspx?skinid~200&libid~34.
Wincustomize.com et al. "M14 Weather ColorPak" Oct. 5, 2004, 1 page, [online] [Retrieved on Feb. 15, 2010] Retrieved from the internet <URL: http://www.wincustomize.com/ skins aspx?skinid~159&libid~34>.
Wincustomize.com et al. "Movie Listings" Sep. 2004, 7 pages, [online] [Retrieved on Feb. 15, 2010] Retrieved from the internet URL:http://www.wincustomize.com/skins.aspx?skinid~101&libid~34&p~1.
Wincustomize.cometal. "CNB-WeatherWidget", Mar. 26, 2004, 1 page, [online] [Retrieved on Feb. 15, 2010] Retrieved from the internet <URL: http://www.wincustomize.com/skins.aspx?skinid~25&libid~34>.
Yahoo Widget Engine Reference Manual, Dec. 7, 2005, 229 pages.
Yes . . . another Newbie in need of Help! How do I set Hotkeys?, Jul. 25, 2004, 2 pages.

\* cited by examiner

WORKFLOW WIDGETS

RELATED APPLICATIONS

This application is a continuation of, and claims priority to U.S. application Ser. No. 12/784,438, entitled "Workflow Widgets," filed May 20, 2010, which is a continuation of U.S. application Ser. No. 11/432,283, entitled "Workflow Widgets," filed May 10, 2006, now issued as U.S. Pat. No. 7,752,556, on Jul. 6, 2010, the entire contents of each of which are incorporated herein by reference.

This application is related to the following jointly owned and patent applications, each incorporated herein by reference in its entirety:

U.S. patent application Ser. No. 10/877,968, for "Unified Interest Layer For User Interface," filed Jun. 25, 2004;

U.S. patent application Ser. No. 11/145,577, entitled "Widget Authoring and Editing Environment," filed Jun. 3, 2005;

U.S. patent application Ser. No. 11/148,010, for "Preview and Installation of User Interface Elements in a Display Environment," filed Jun. 7, 2005;

U.S. Provisional Patent Application No. 60/734,016, for "Preview Including Theme Based Installation of User Interface Elements In A Display Environment," filed Nov. 4, 2005, which provisional patent application is incorporated herein by reference in its entirety;

U.S. Provisional Patent Application No. 60/730,956, for "Widget Security," filed Oct. 27, 2005, which provisional application is incorporated herein by reference in its entirety;

U.S. patent application Ser. No. 11/282,110, for "Preview Including Theme Based Installation of User Interface Elements In A Display Environment," filed Nov. 16, 2005;

U.S. Provisional Patent Application No. 60/737,899, for "Management of User Interface Elements In A Display Environment," filed Nov. 18, 2005;

U.S. patent application Ser. No. 11/346,603, for "Multiple Dashboards," filed Feb. 1, 2006; and U.S. patent application Ser. No. 11/403,644, for "Linked Widgets," filed Apr. 12, 2006.

TECHNICAL FIELD

The disclosed implementations relate generally to graphical user interfaces.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

Although users appreciate interfaces that can present information on a screen via multiple windows, the result can be overwhelming. For example, users may find it difficult to navigate to a particular user interface element or to locate a desired element among a large number of onscreen elements. The problem is further compounded when user interfaces allow users to position elements in a desired arrangement, including overlapping, minimizing, maximizing, and the like. Although such flexibility may be useful to the user, it can result in a cluttered display screen. Having too many elements displayed on the screen can lead to "information overload," thus inhibiting the user to efficiently use the computer equipment.

Many of the deficiencies of conventional user interfaces can be reduced using "widgets." Generally, widgets are user interface elements that include information and one or more tools (e.g., applications) that let the user perform common tasks and provide fast access to information. Widgets can perform a variety of tasks, including without limitation, communicating with a remote server to provide information to the user (e.g., weather report), providing commonly needed functionality (e.g., a calculator), or acting as an information repository (e.g., a notebook). Widgets can be displayed and accessed through a user interface, such as a "dashboard layer," which is also referred to as a "dashboard." Widgets and dashboards are described in co-pending U.S. patent application Ser. No. 10/877,968, entitled "Unified Interest Layer For User Interface."

The simplicity and utility of widgets and dashboards make them suitable alternatives or improvements to traditional workflow technologies (e.g., email, Instant Messaging, etc.).

SUMMARY

Systems, methods, computer-readable mediums, user interfaces and other implementations are disclosed for incorporating widgets into workflows.

In some implementations, a widget workflow method includes: launching a widget at a first device; and updating the widget with content created at a second device.

In some implementations, a widget workflow method includes: making a widget available to one or more subscribing devices, wherein the widget includes content at least some of which can be modified; receiving content updates from the one or more subscribing devices; if more than one content update is received, aggregating the content updates; and making the aggregated content updates available to at least one of the one or more subscribing devices.

In some implementations, a widget workflow method includes: receiving a request associated with a widget, the request including one or more commands and data; and executing the commands using at least some of the data.

In some implementations, a widget workflow system includes a workflow communication manager configured to facilitate workflow communications between a plurality of devices. A repository is coupled to the workflow communication manager and is configured to store workflow information received from devices.

Other implementations are disclosed which are directed to systems, methods, apparatuses, computer-readable mediums and user interfaces.

DETAILED DESCRIPTION

Hardware Architecture

Figure 1:
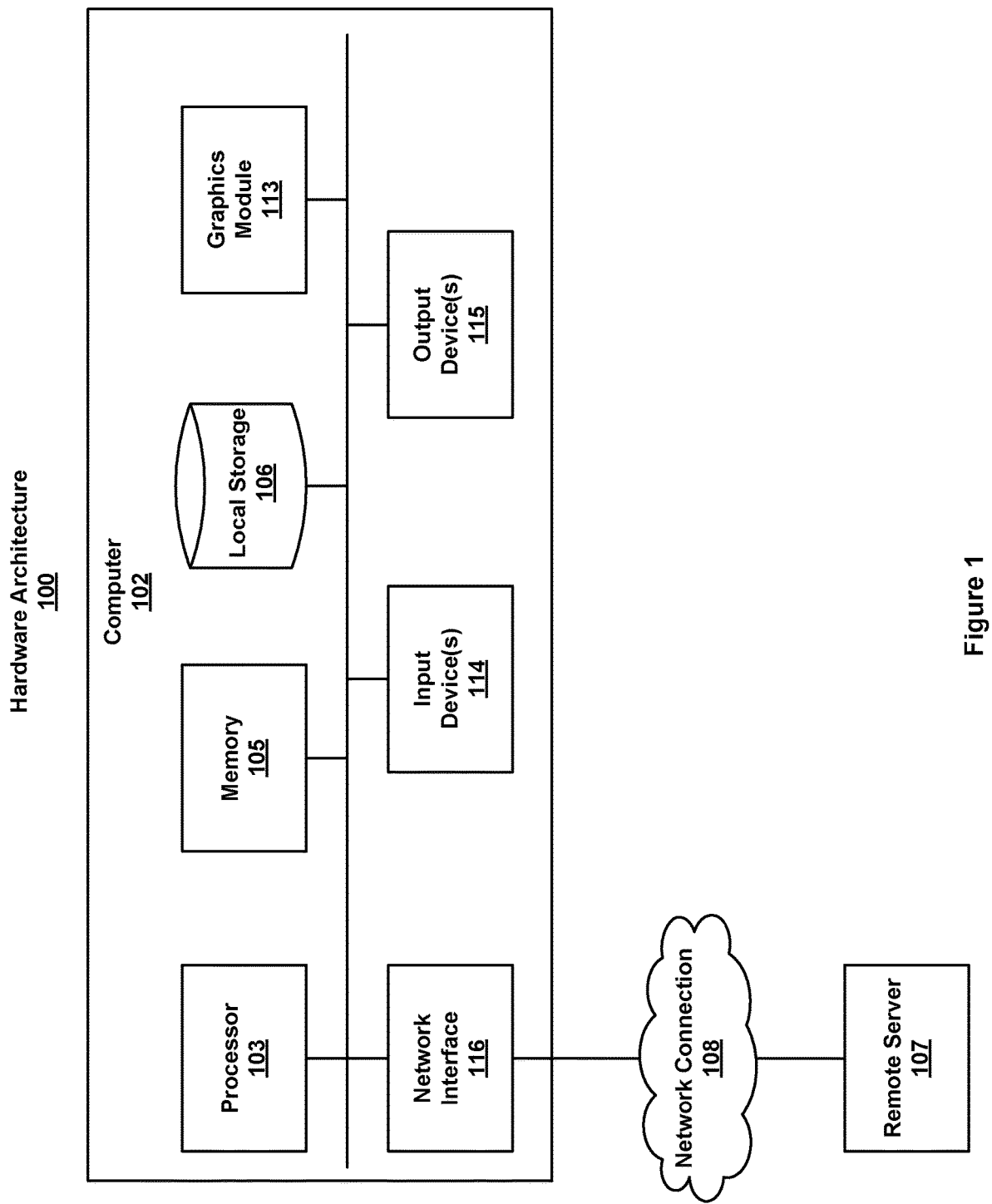
FIG. 1 is a block diagram of a hardware architecture for implementing dashboards.

FIG. 1 is a block diagram of a hardware architecture 100 for implementing workflow widgets. The architecture 100 includes a personal computer 102 coupled to a remote server 107 via a network interface 116 and a network connection 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While workflow widgets are described herein with respect to a personal computer 102, it should be apparent that the disclosed implementations can be incorporated in, or integrated with, any electronic device that is capable of using widgets, including without limitation, portable and desktop computers, servers, electronics, media players, game devices, mobile phones, email devices, personal digital assistants (PDAs), televisions, etc.

A dashboard system and method for managing and displaying dashboards and workflow widgets can be implemented as one or more plug-ins that are installed and run on the personal computer 102. The plug-ins are configured to interact with an operating system (e.g., MAC OS® X, WINDOWS XP, LINUX, etc.) and to perform the various dashboard and widget functions, as described with respect of FIGS. 2-8. A dashboard system and method can also be implemented as one or more software applications running on the computer 102. In some implementations, a dashboard system can be another widget that is configurable to communicate with other widgets, applications and/or operating systems. A dashboard system and method can also be characterized as a framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.).

For illustrative purposes, widgets (including linked widgets) are described as a feature of an operating system. Workflow widgets, however, can be implemented in other contexts as well, including e-mail environments, desktop environments, application environments, hand-held display environments, and any other display environments.

Dashboard Overview

Figure 2:
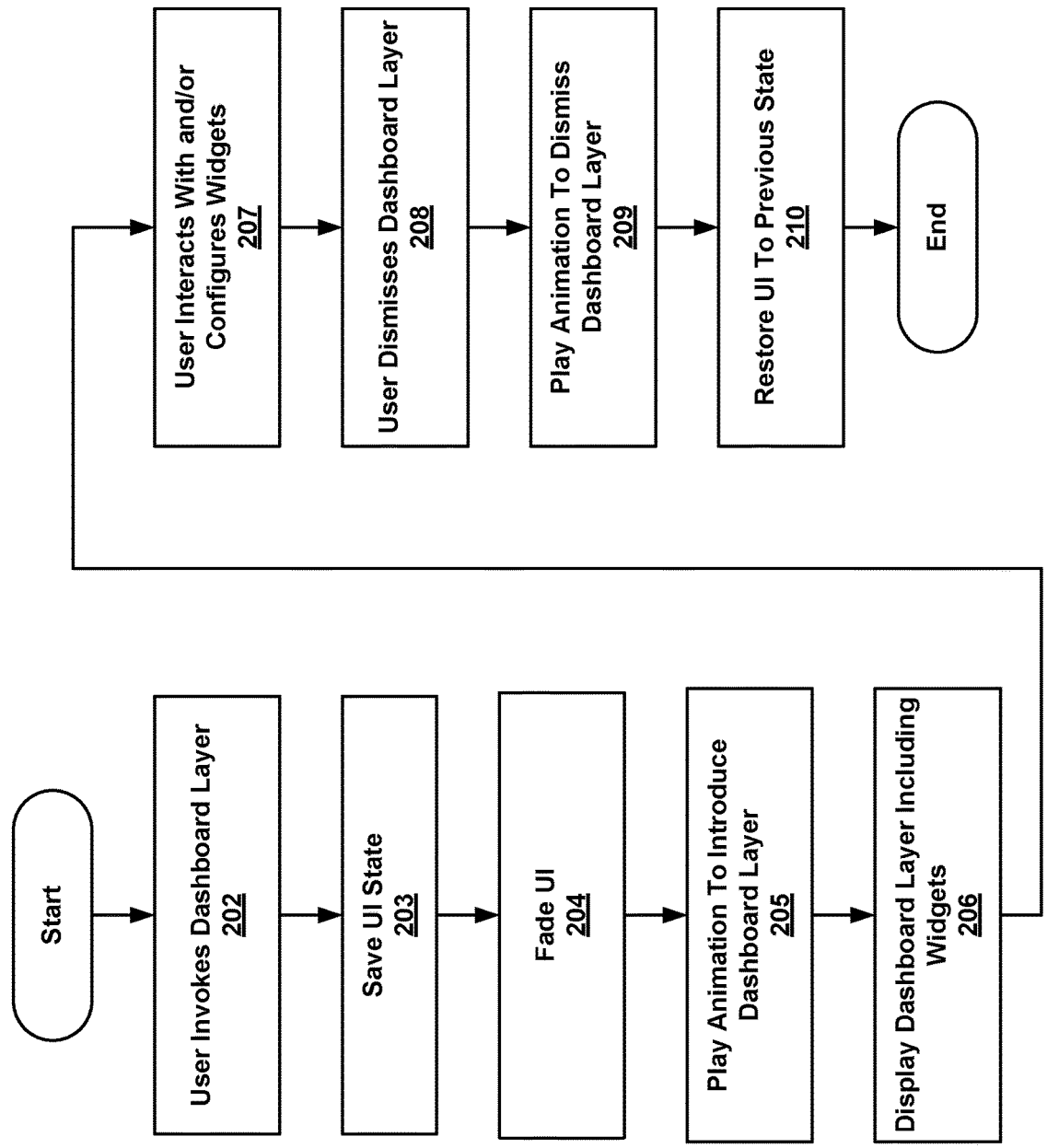
FIG. 2 is a flow diagram of a process for activating and using a dashboard.

FIG. 2 is a flow diagram of an implementation of a process for activating and using one or more dashboard layers. A dashboard layer (also referred to herein as a "unified interest layer" or "dashboard") is used to manage and display widgets (including linked widgets). A user can invoke a dashboard (202) by hitting a designated function key or key combination, or by clicking on an icon, or by selecting a command from an onscreen menu, or by moving an onscreen cursor to a designated corner of the screen. Alternatively, a dashboard layer can be invoked programmatically by another system, such as an application or an operating system, etc.

In response to such user input, the current state of the user interface is saved (203), the user interface is temporarily inactivated (204), an animation or effect is played or presented to introduce the dashboard (205) and the dashboard is displayed with one or more widgets (206). If applicable, a previous state of the dashboard is retrieved, so that the dashboard can be displayed in its previous configuration.

In some implementations, the dashboard is overlaid on an existing user interface (UI) (e.g., a desktop UI). When the dashboard is activated, the existing UI may be faded, darkened, brightened, blurred, distorted, or otherwise altered to emphasize that it is temporarily inactivated. The existing UI may or may not be visible behind the dashboard. The UI can also be shrunk to a small portion of the display screen while the dashboard is active, and can be re-activated by clicking on it. In some implementations, the UI is shrunk and presented as a widget. The UI can be re-activated by clicking on the widget. In some implementations the UI remains active when the dashboard is active.

The user interacts with and/or configures widgets as desired (207). In some implementations, the user can move widgets around the screen, and can resize widgets if applicable. Some widgets are resizable and some have a fixed size. A widget author can specify whether a widget can be resized. Some widgets automatically resize themselves based on the amount or nature of the data being displayed. Widgets can overlap and or repel one another. For example, if the user attempts to move one widget to a screen position occupied by another widget, one of the widgets is automatically moved out of the way or repelled by the other widget.

In some implementations, the user dismisses the dashboard (208) by invoking a dismissal command, which causes the UI layer to return or re-present itself to the display screen. In some implementations, the dashboard is dismissed when the user presses a function key or key combination (which may be the same or different than the key or combination used to activate the dashboard), or clicks on a close box or other icon, or clicks on negative space within the dashboard (e.g., a space between widgets), or moves an onscreen cursor to a predefined corner of the screen.

In some implementations, the dashboard is automatically dismissed (i.e., without user input) after some predetermined period of time or in response to a trigger event. An animation or other effect can be played or presented to provide a transition as the dashboard is dismissed (209). When the dashboard is dismissed, the current configuration or state of the widgets (e.g., position, size, etc.) is stored, so that it can be retrieved the next time the dashboard is activated. In some implementations, an animation or effect is played or presented when re-introducing the UI. The UI is restored to its previous state (210) so that the user can resume interaction with software applications and/or the operating system.

In some implementations, the dashboard is configurable. The user can select a number of widgets to be displayed, for example, by dragging the widgets from a configuration bar (or other user interface element) onto the dashboard. The configuration bar can include different types of widgets, and can be categorized and/or hierarchically organized. In some implementations, in response to the user dragging a widget onto the configuration bar, the widget is downloaded from a server and automatically installed (if not previously installed). In some implementations, certain widgets can be purchased, so the user is requested to provide a credit card number or some other form of payment before the widget is installed on the user's machine. In some implementations, widgets are already installed on the user's machine, but are only made visible when they have been dragged from the configuration bar onto the dashboard. The configuration bar is merely an example of one type of UI element for configuring the dashboard. Other configuration mechanisms can be used, such as an icon tray or menu system.

It should be apparent that there are many ways in which dashboards and widgets can be displayed other than those implementations described herein. For example, widgets can be displayed on any user interface or user interface element, including but not limited to desktops, browser or application windows, menu systems, trays, multi-touch sensitive displays and other widgets.

Software Architecture

Figure 3:
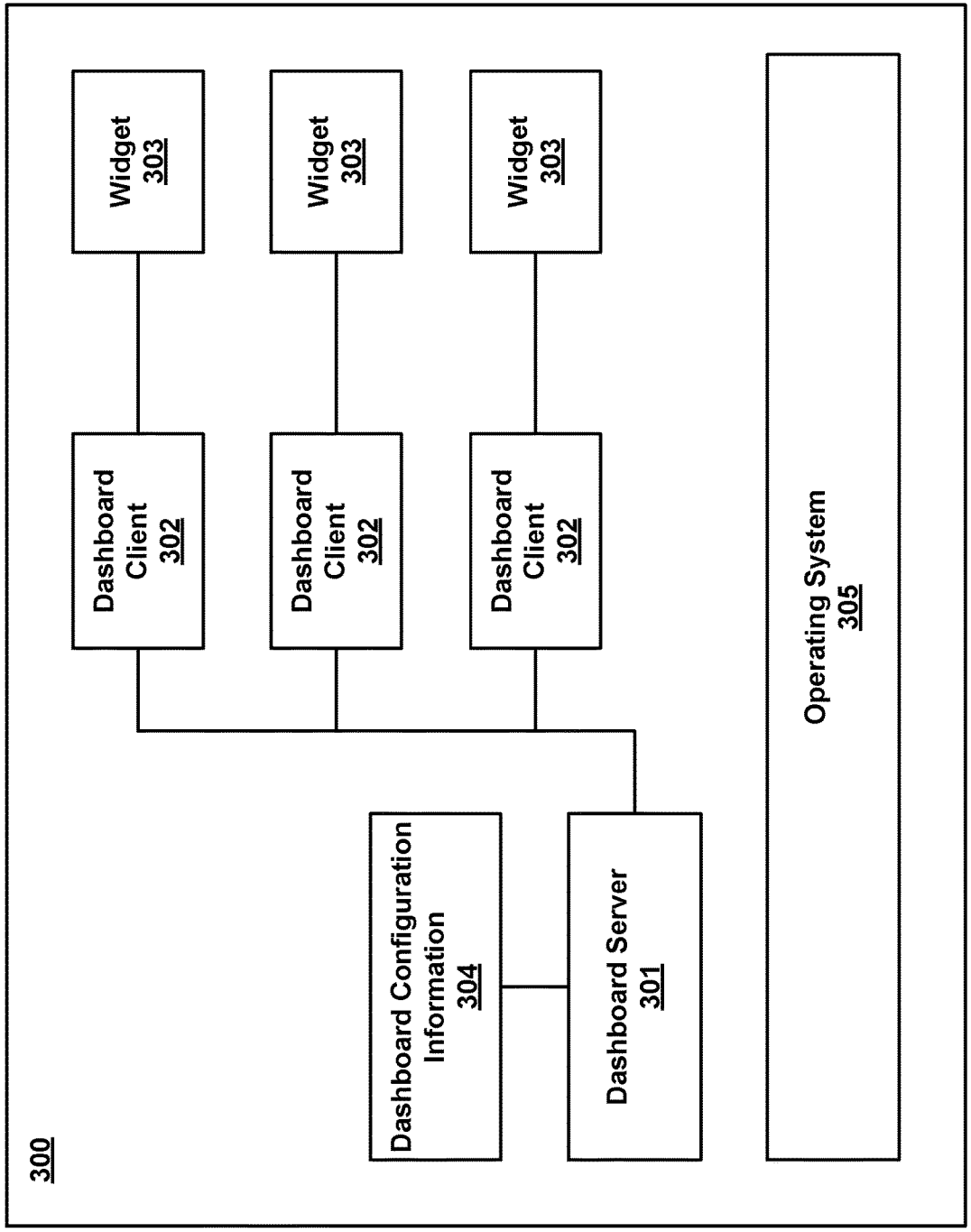
FIG. 3 is a block diagram of a software architecture for implementing dashboards.

FIG. 3 is a block diagram of a software architecture 300 for implementing dashboards for installing, displaying and launching workflow widgets. The software architecture 300 generally includes a dashboard server 301, one or more dashboard clients 302, and one or more widgets 303. The server 301 and/or clients 302 use dashboard configuration information 304 to specify configuration options for displaying the widgets 303, including access levels and the like (if applicable). Such configuration information can include information for two or more dashboards configured by the same user or by different users.

In some implementations, the widgets 303 are displayed using HTML and related web technology. The dashboard server 301 manages and launches the dashboard client 302 processes. Each dashboard client 302 loads a widget 303 (e.g., an HTML webpage) and related resources needed to display the page. In some implementations, the dashboard clients 302 display the widgets 303 without a conventional window frame, menu bar, or other components typically associated with on-screen windows. This technique provides a clean, straightforward display of the overall dashboard to reduce confusion and clutter. The dashboard clients 302 display their respective widgets 303 by rendering web pages into a "WebView," as described in U.S. patent application Ser. No. 11/148,010, entitled "Preview and Installation of User Interface Elements in a Display Environment." The size of each WebView is defined as metadata associated with the corresponding widget 303. The server 301 provides data for rendering the dashboard layer that can be overlaid on a desktop user interface. In some implementations, the widgets 303 are rendered into the dashboard layer, which is drawn on top of the desktop user interface, so as to partially or completely obscure the desktop user interface while the dashboard layer is active.

Dashboard Server

The dashboard server 301 can be a stand-alone process or embedded in another process. The server 301 can be located at the computer 102 or at the remote server 107. In some implementations, the server 301 provides functionality for one or more processes, including but not limited to: widget workflow, non-widget UI management, window management, fast login, event management, loading widgets, widget arbitration, Core Image integration and widget preference management, as described in U.S. patent application Ser. No. 11/148,010, entitled "Preview and Installation of User Interface Elements in a Display Environment."

Dashboard Client

In some implementations, a dashboard client 302 is a process that uses, for example, objects that are defined as part of a development environment, such as Apple Computer's Cocoa Application Framework (also referred to as the Application Kit, or AppKit) for the Mac OS® operating system. In some implementations, the dashboard clients 302 can be implemented as simplified browser screens that omit conventional interface features such as a menu bar, window frame, and the like.

Widget Format

In one implementation, each widget 303 is implemented as an HTML file. The HTML file can reference other local and remote resources such as style sheets (e.g., Cascading Style Sheets), other HTML files, JavaScript files, images, and the like. Widgets 303 can be implemented using, for example, a flat bundle file format or a packaged HTML file format. In some implementations, the Flat Bundle format includes an info.plist file.

The Info.plist files describes a widget 303 and provides an identifier for a widget 303. Table I provides an example of Info.plist file contents.

TABLE I

Example of Info.plist File Contents

| Key | Type | Description/Value |
|---|---|---|
| CFBundleIdentifier | CFString | com.apple.widget.<widget name> |
| CFBundleName | CFString | Name of the widget. |
| MainHTML | CFString | Name of main HTML resource. |
| Width | CFNumber | Default width of the widget. |
| Height | CFNumber | Default height of the widget. |
| DefaultImage | CFString | Resource name of |

TABLE I-continued

Example of Info.plist File Contents

| Key | Type | Description/Value |
| --- | --- | --- |
| Plugin (optional) | CFString | default PNG file. Resource name of native plug-in. |
| AllowFileAccessOutsideofWidget | Boolean | Access to files across the file system; limited by the users permissions. |
| AllowFullAccess | Boolean | Access to the file system, Web Kit and standard browser plug-ins, Java applets, network resources, and command-line utilities. |
| AllowInternetPlugins | Boolean | Access to Web Kit and standard browser plug-ins. |
| AllowJava | Boolean | Access to Java applets. |
| AllowNetworkAccess | Boolean | Access to any resources that are not file based. |
| AllowSystem | Boolean | Access to command-line utilities using widget script object. |

The keys AllowFileAccessOutsideofWidget, AllowFullAccess AllowInternetPlugins, AllowJava, AllowNetworkAccess, and AllowSystem are Boolean types that can be set by a widget author to enable certain levels of resource access.

Dashboard Invocation

Figure 4A:
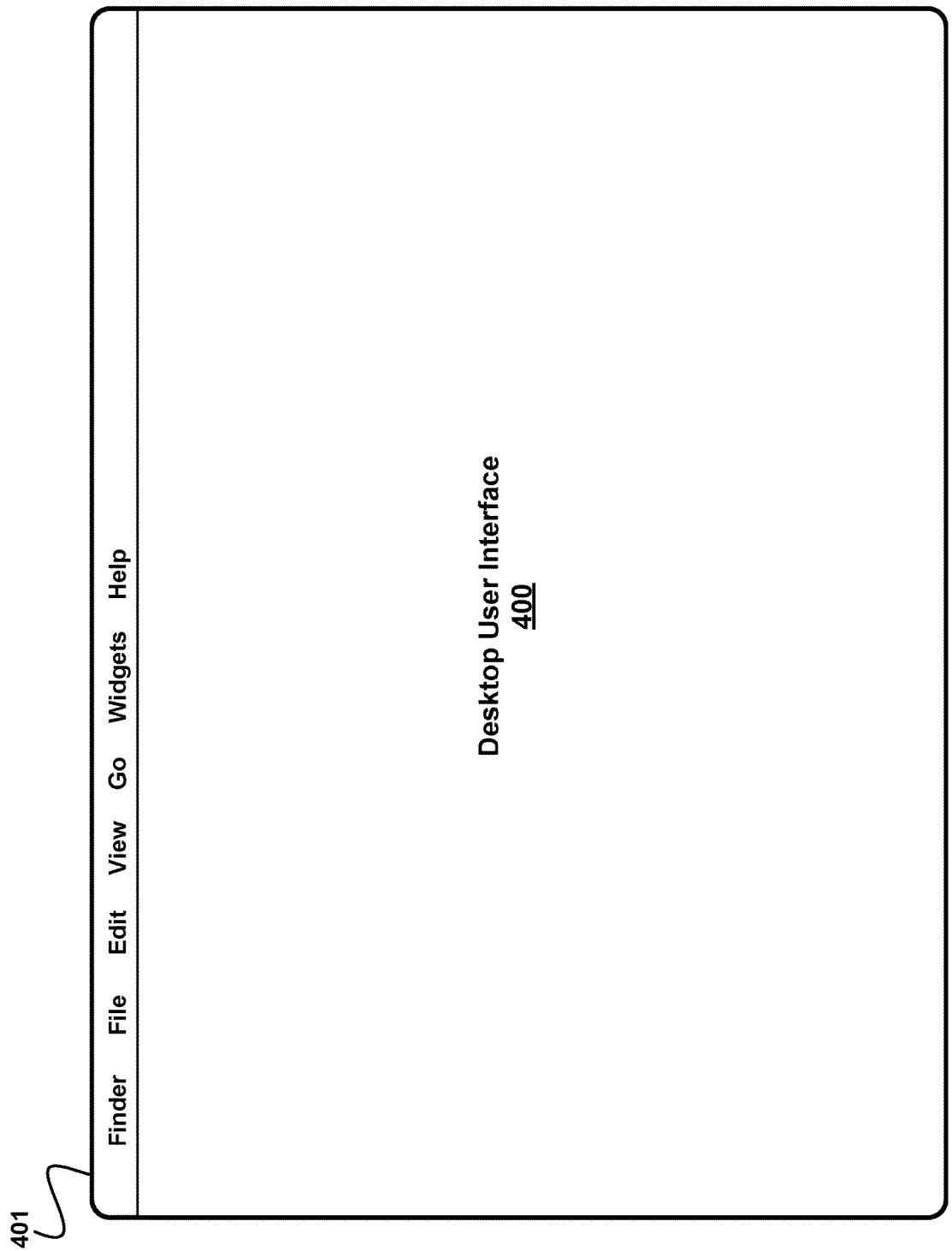
FIG. 4A is a screen shot depicting a desktop user interface prior to activation of a dashboard.

FIG. 4A depicts a desktop user interface 400 prior to activation of a dashboard. The desktop user interface 400 (also referred to herein as "desktop") is a conventional user interface as may be provided by an operating system, such as Mac OS®. The desktop 400 has a background image, menu bar 401, and other standard features. As is known in the art, the desktop 400 may also include windows, icons, and other elements (not shown). The user activates the dashboard by selecting an item from a menu, or by clicking on an icon, or by pressing a function key or key combination, or by some other means for invoking activation. A dashboard does not have to be activated on a desktop; rather the dashboard can be activated and displayed on any display screen with or without a desktop.

Figure 4B:
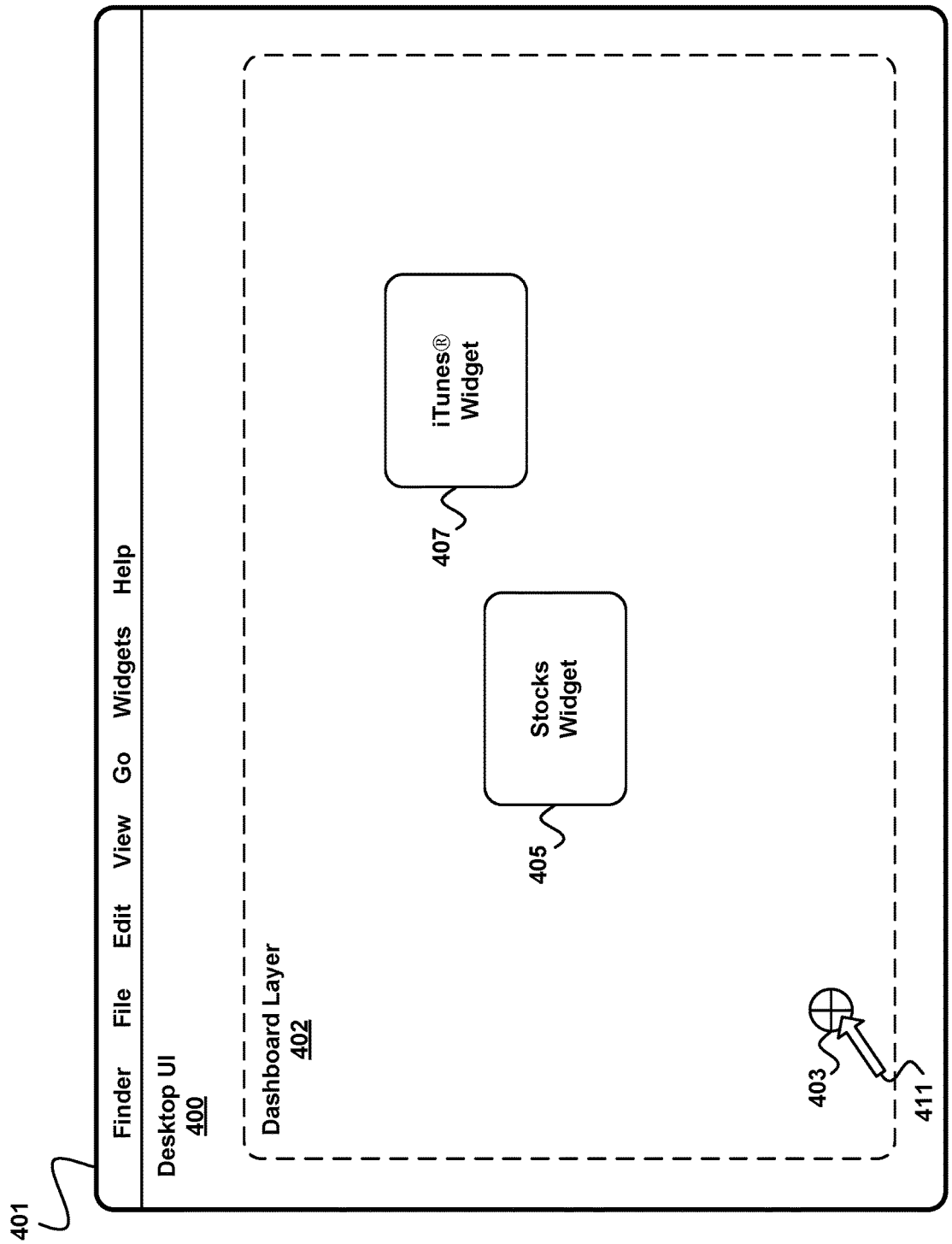
FIG. 4B is a screen shot depicting an initial state for a dashboard.

FIG. 4B depicts an initial state for a dashboard layer 402. In some implementations, a configuration bar icon 403 is initially displayed. Alternatively, upon activation the dashboard layer 402 can display one or more default widgets 405, 407. If the dashboard layer 402 has previously been activated and configured, the widgets 405, 407, can be displayed as previously configured. The dashboard layer 402 is not necessarily visible as a distinct layer. However, its various components (such as widgets, icons, and other features) are visible. In some implementations, these components are displayed in a transparent layer, thus maintaining the visibility of the desktop 400 to the user. In some implementations, the desktop 400 and its components are darkened (or blurred, or otherwise visually modified) while the dashboard layer 402 is active, so as to emphasize that the desktop 400 is temporarily inactive. In other implementations, the desktop 400 is not visible while the dashboard layer 402 is active. The user can reactivate the desktop 400 and dismiss the dashboard layer 402 by clicking on an area of the screen where no dashboard element is displayed (i.e., "negative space"). In some implementations, other commands, key combinations, icons, or other user input can be used to dismiss the dashboard layer 402.

Figure 4C:
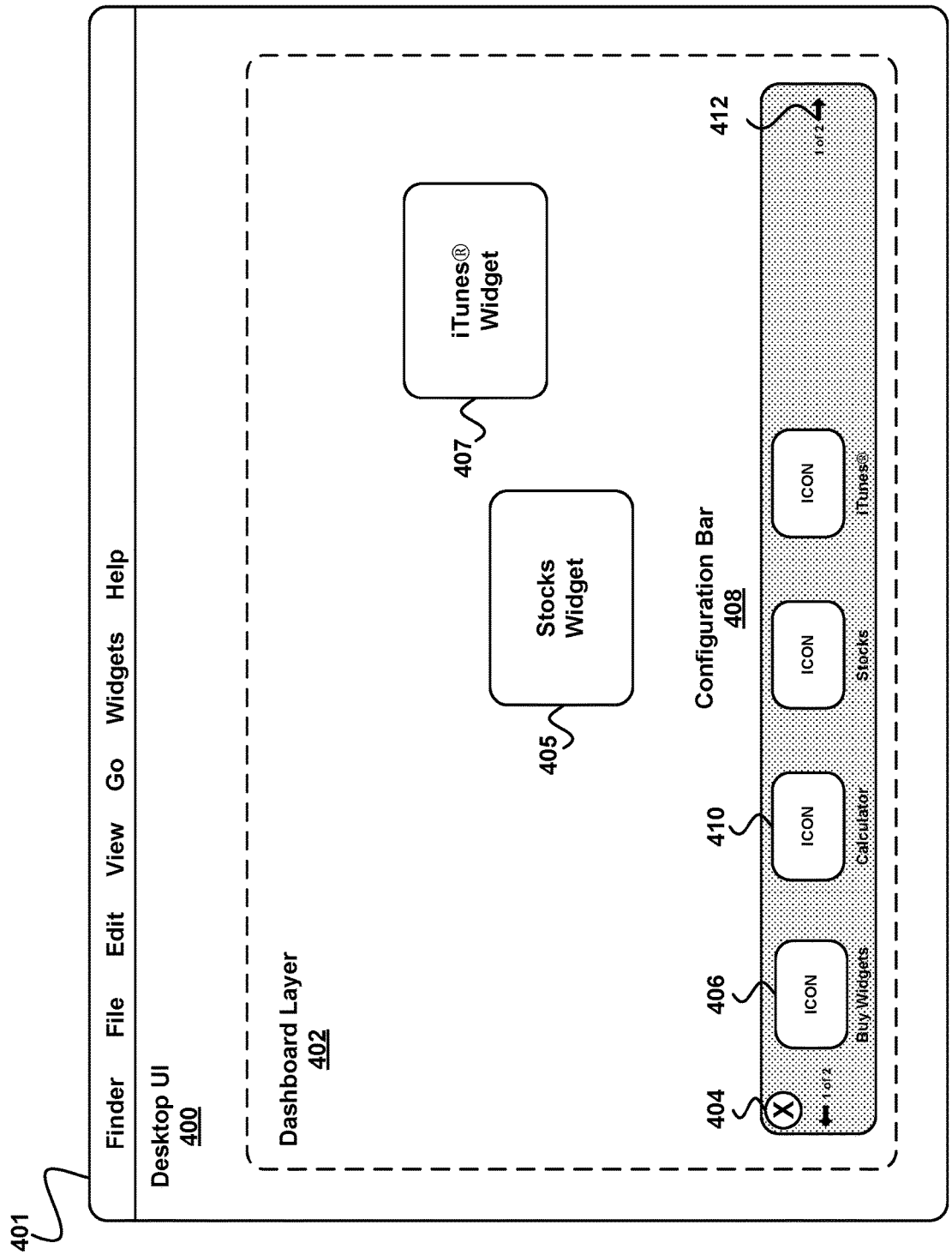
FIG. 4C is a screen shot depicting a configuration bar for a dashboard.

In some implementations, the user can drag the icon 403 to any location on the screen, and the position of the icon 403 will remain persistent from one invocation of the dashboard layer 402 to the next. The user can click on the icon 403 to activate the configuration bar 408, as shown in FIG. 4C. The configuration bar 408 provides access to various widgets that can be placed on the dashboard. In some implementations, a text label is shown for each available widget (e.g., calculator, stocks, iTunes®, etc.). In some implementations, an icon is shown for each available widget (e.g., calculator icon 410). If many widgets are available, the widgets may be arranged hierarchically by type (e.g., game widgets, utility widgets, etc.), or alphabetically, or by any other categorization methodology. For example, a number of categories may be displayed, and clicking on one of the categories causes a pull-down menu to be displayed, listing a number of widgets in that category. In some implementations, a buy widget 406 is also available, allowing the user to select widgets from an online store or website.

Note that the particular configuration and appearance of configuration bar 408 in FIG. 4C is merely exemplary, and that many other arrangements are possible. For example, widgets can be installed from other locations, other applications or other environments, without requiring that they first be part of the configuration bar 408. The user can dismiss the configuration bar 408 by clicking on dismissal button or icon 404.

Installation of Elements

Elements, including user interface elements such as widgets can be installed in a display environment as discussed below. One display environment, a dashboard, will be used for illustrative purposes. Installation can include a preview operation as is discussed below. Installation can include selection of the element, such as by a drag and drop action. Other selection means can be used. In one example, a user can drag widgets from configuration bar 408 onto the surface of the dashboard (in other words, anywhere on the screen), using standard drag-and-drop functionality for moving objects on a screen.

Figure 4D:
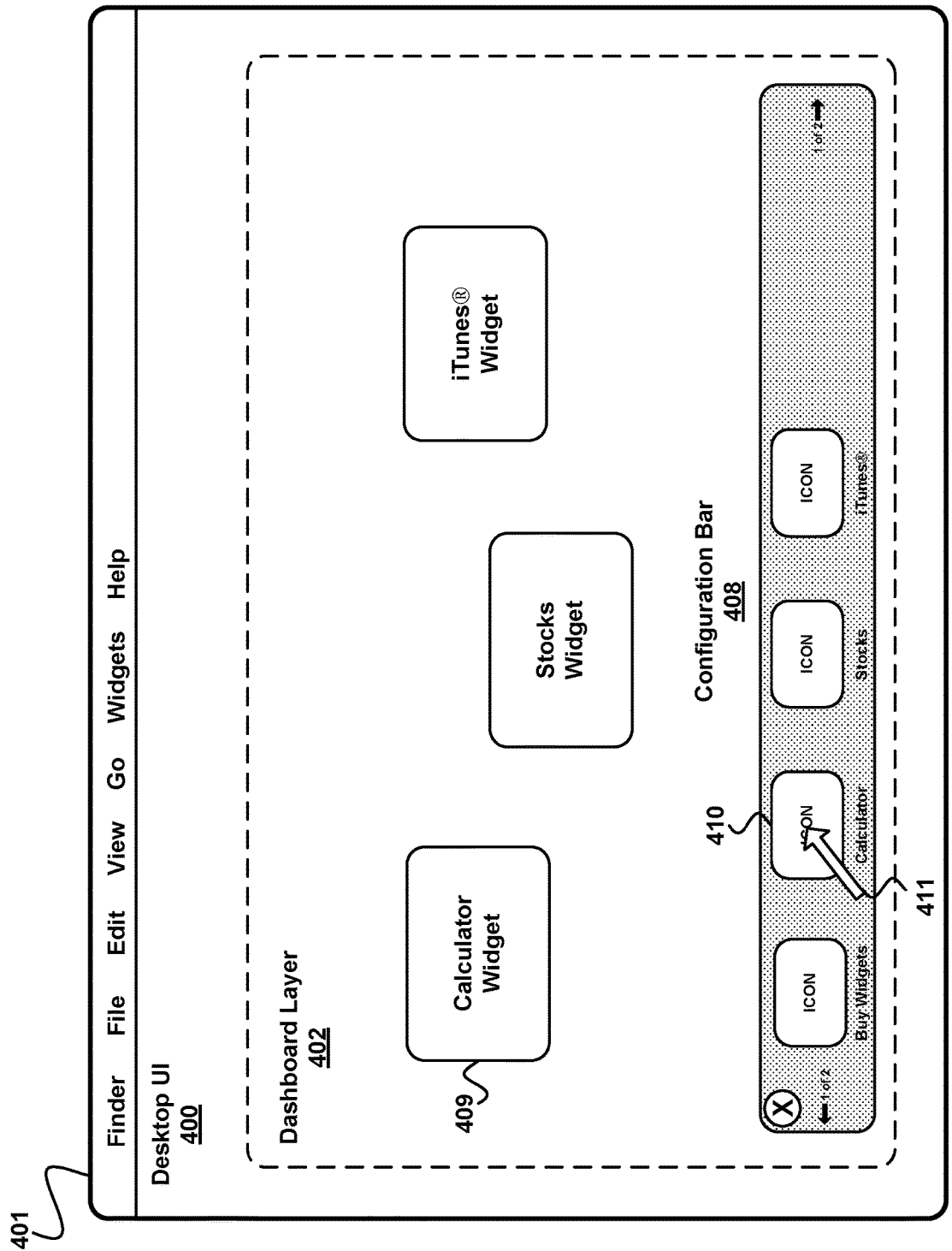
FIG. 4D is a screen shot depicting user selection of a widget from the configuration bar.

FIG. 4D depicts the selection of the calculator widget icon 410 from the configuration bar 408. The calculator icon 410 which is associated with a calculator widget 409 is highlighted, or otherwise augmented or embellished, to indicate that it has been selected by a user with cursor 411.

In some implementations, widgets in the configuration bar 408 are smaller than their actual size when installed. When the user clicks on a widget and begins to drag it into a dashboard or other display environment, the widget is animated to its actual or installed size to assist the user in the real-time layout of the dashboard. By animating the widget to its actual size, the user will know the actual size of the widget prior to its installation.

In some implementations, an animation, such as a ripple animation, is shown when the user "drops" a widget by releasing a mouse button (or equivalent input device) to place a widget at the desired location. In one implementation, the dragging of the widget to the dashboard layer 402 invokes an installation process for installing the widget including previewing. After installation, the user can move a widget, to any other desired location, or can remove the widget from the screen, for example by dragging it off the screen, or dragging it back onto the configuration bar 408, by invoking a remove command, disabling a widget in a menu associated with a widget manager or canceling the installation during the preview. In some implementations, the position, state, and configuration of a widget are preserved when the dashboard layer 402 is dismissed, so that these characteristics are restored the next time the dashboard layer 402 is activated.

In some implementations, widgets and/or dashboard layers (including widgets) can be installed from within a running application. For example, a widget and/or dashboard (including widgets) can be an attachment to an email. When the user clicks the attachment, an installation process is invoked for the widget and/or dashboard which can also include a preview.

Widgets can be created or instantiated using an installer process. The installer process can include a separate user interface or an integrated user interface (e.g., integrated in the display environment or separate from the display environment, for example, in another display environment associated with another application, such as an email application) for selecting and installing widgets in a display environment. For example, a widget received as an email attachment can be launched by a user from directly within a user interface of the email application.

Widgets can be created or instantiated using an installer process. The installer process can include a separate user interface or an integrated user interface (e.g., integrated in the display environment or separate from the display environment for example in another display environment associated with another application, such as an email application) for selecting and installing widgets in a display environment. Thus, the installation area for the widget can be embedded within an application display area or window. For example, if a user receives a widget as an attachment to an email, the user can invoke and install the widget from within the email message window without the need for a separate installation window.

In general, an installer process is used to provide additional functionality to the creation/instantiation process, beyond the simple drag and drop operation describe above. Additional functionality can include preview, security and deletion functionality in a singular interface. The installer process can be a separate process or combined in another process. The installer process can itself be a separate application that is executable to install widgets (or other elements) in a display environment. As used herein, the term "process" refers to a combination of functions that can be implemented in hardware, software, firmware or the like.

Workflow Widgets

Figure 5:
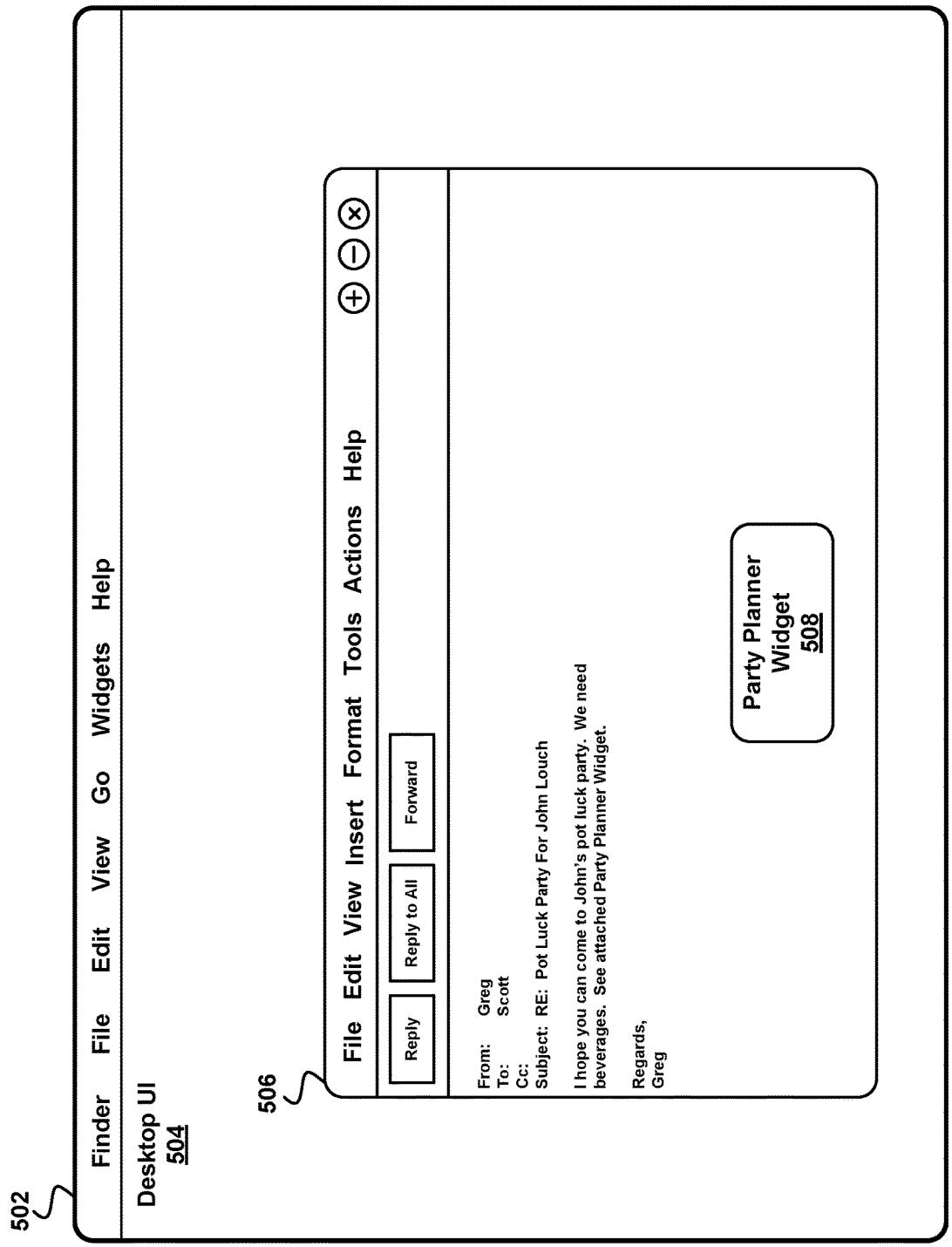
FIG. 5 is a screen shot depicting an exemplary workflow widget as an attachment to an email application.

FIG. 5 is a screen shot depicting an exemplary workflow widget as an attachment to an email application. Generally, workflow widgets can be used to simplify workflows that exist in every day life. Workflows are processes or procedures for accomplishing a task where two or more individuals interact to accomplish the task. Workflow widgets do not have to be related to work. Any process can benefit from workflow widgets, including processes that are performed solely for entertainment or enjoyment.

In some implementations, an email message window 506 is generated by an email application and displayed in a user interface 504 for presentation on a display device (e.g., computer, mobile phone, PDA, etc.). Attached to the email is a workflow widget 508. When a user clicks on the workflow widget 508, or otherwise interacts with it (e.g., mouse rollover), the workflow widget 508 is launched from within the email. Alternatively, the workflow widget 508 can launch itself when the user opens the email. In some implementations, the widget can be dragged from the email message window 506 and dropped into another display area (e.g., a dashboard, a desktop UI, etc.) or a configuration bar before it is launched. When the widget 508 is launched from within the email application it can register with one or more dashboards and become part of a dashboard even after the application is closed without further interaction with the user. In some implementations, the email includes a link, which when clicked by a user causes one or more widgets to be launched. The link can be a URL or Uniform Resource Identifier (URI), which contains information that can be used by a dashboard layer or operating system to launch a widget and populate the widget with data, as described with respect to FIGS. 12A-12C.

Although the implementation described above includes an email application, workflow widgets can be delivered using any known communication applications or techniques, including but not limited: instant messaging, Internet conferencing and the like. Generally, workflow widgets are widgets that are capable of receiving data from users, other widgets, URL Requests or any other information source for purposes of simplifying or accomplishing a work-related process. An exemplary operation of a workflow widget 508 will now be described through the perspective of four individuals (Greg, Scott, Imran and Eric) who are throwing a party for a mutual friend (John).

Figure 6:
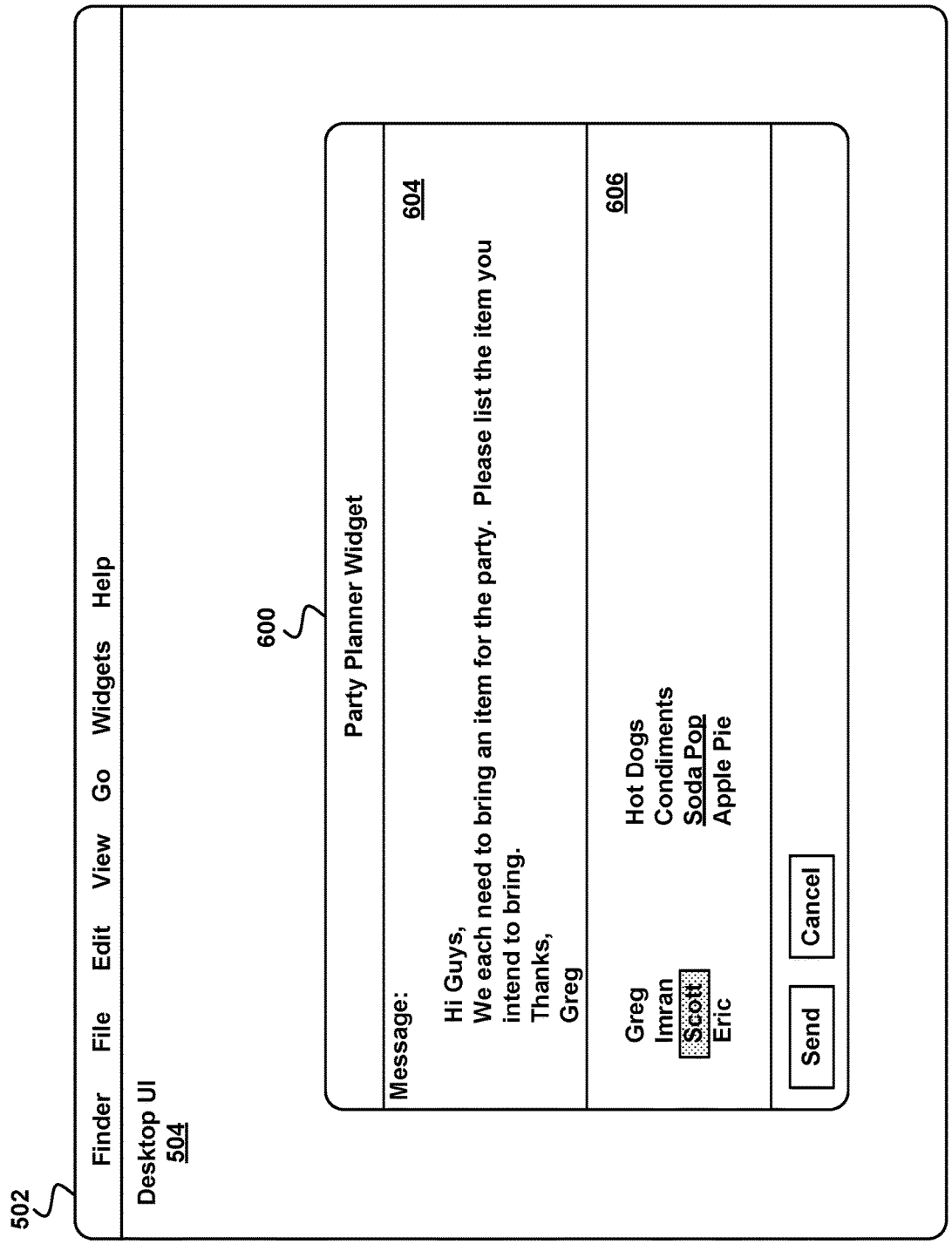
FIG. 6 is a screen shot depicting an exemplary user interface for a workflow widget.

Greg decides to throw a potluck party for his colleague John. He composes an email to Scott on his desktop computer, attaches a party planning widget 508 using attachment mechanisms included with known email applications (e.g., Apple Computer's Mail application, Microsoft's Outlook® application, etc.), and sends the email to Scott using a known email protocol (e.g., Post Office Protocol (POP), Internet Message Access Protocol (IMAP), etc.). Scott receives the email on his PDA device and launches the attached party planning widget 508. The party planning widget 508 presents a user interface, which includes information about the party and a list of items that people are bringing to the party. FIG. 6 is a screen shot depicting an exemplary user interface 600 for the party planning widget 508.

Figure 12A:
FIGS. 12A-12C illustrates communication with widgets using URL requests.
Figure 12B:
Figure 12C:
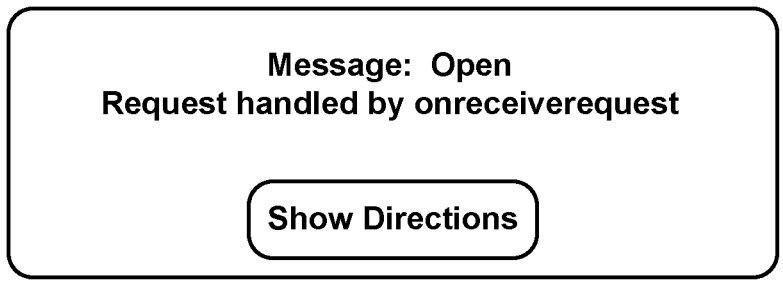

In some implementations, the email includes a link (e.g., a URL or URI), which when opened will cause an instance of one or more widgets associated with the link to be generated by, for example, a dashboard server or other process, as described with respect to FIGS. 12A-12C.

Referring to FIG. 6, the user interface 600 is shown displayed in the desktop UI 504. The user interface 600 can be minimized, closed or resized like a conventional user interface or window using various control mechanisms (e.g., a button). In a first pane 604 of the UI 600, Greg has typed a message to Imran, Scott and Eric, requesting that they each bring an item to the party. In a second pane 606 of the UI 600, the names of the workflow participants (Greg Imran, Scott, Eric) are listed. Next to each name is the item that they will bring to the party or a text box that can be filled in by the participant. In this example, Greg is bringing hot dogs, Imran is bringing condiments and Eric is bringing apple pie. Each of these individual had previously received the party widget 508 on their respective devices (e.g., mobile, phone, PDA, portable computer, etc.) and have selected an item.

Since Scott has not yet selected an item, his name is highlighted or otherwise altered to indicate his pending status. Scott elects to bring soda pop, so he types in the words "Soda Pop." When Scott is finished selecting his item, he clicks a send button 608 or other input mechanism to complete the process. When the send button 608 is clicked, the widget sends the updated list back to Greg's device. The updated list can be sent using known email or instant messaging protocols (e.g., POP3, IMAP, Session Initiation Protocol (SIP), Extensible Messaging and Presence Protocol (XMPP), etc.).

Figure 9:
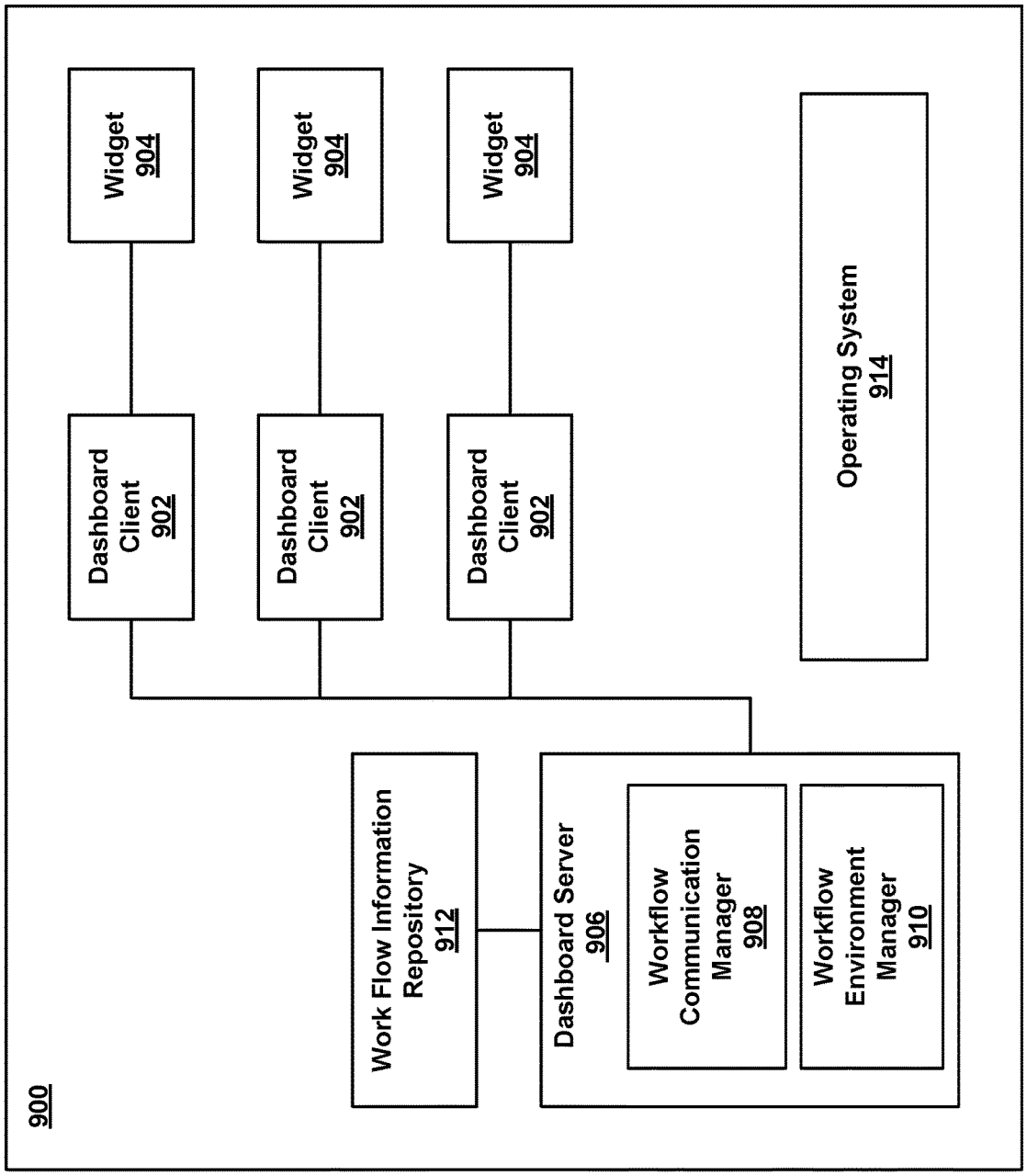
FIG. 9 is a block diagram of an exemplary software architecture for workflow widgets.
Figure 10:
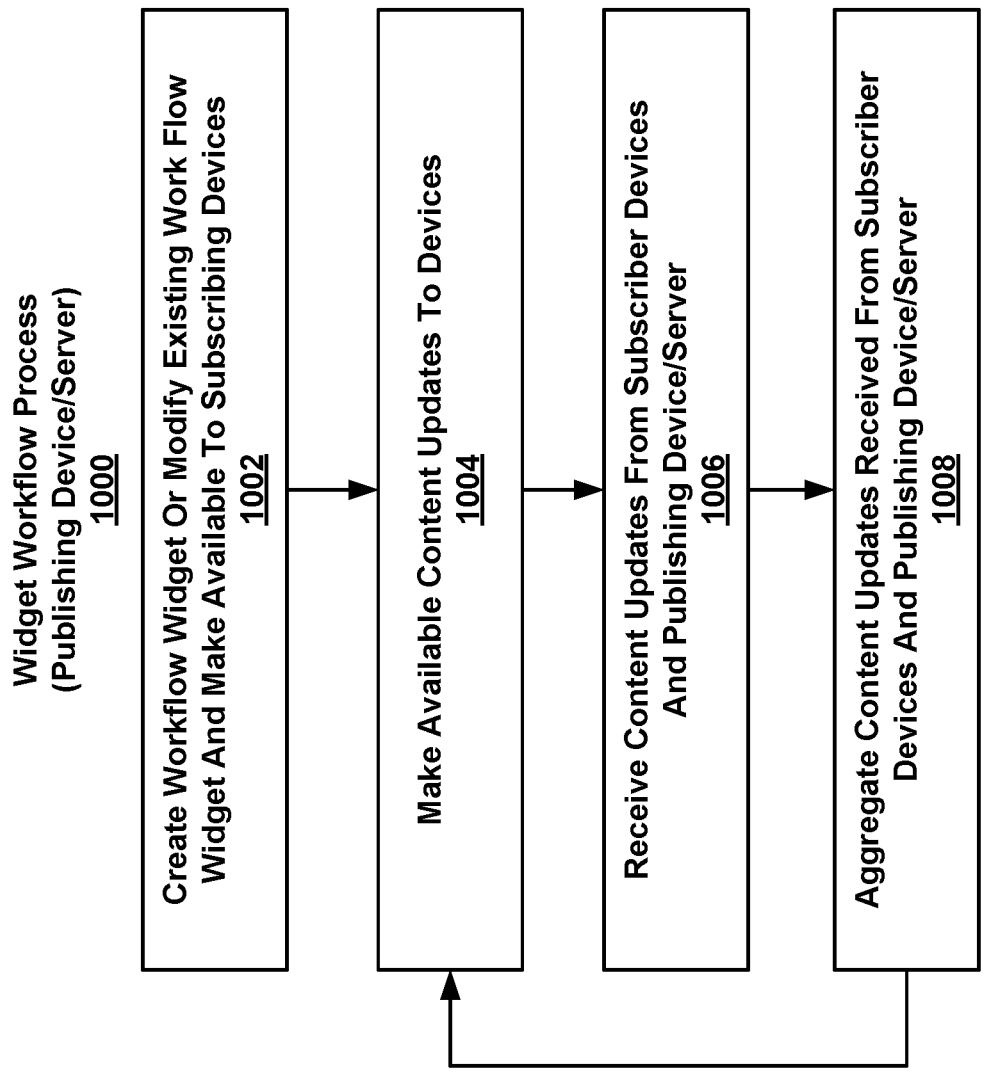
FIG. 10 is a flow diagram of an exemplary widget workflow process for a publishing device or server system.
Figure 11:
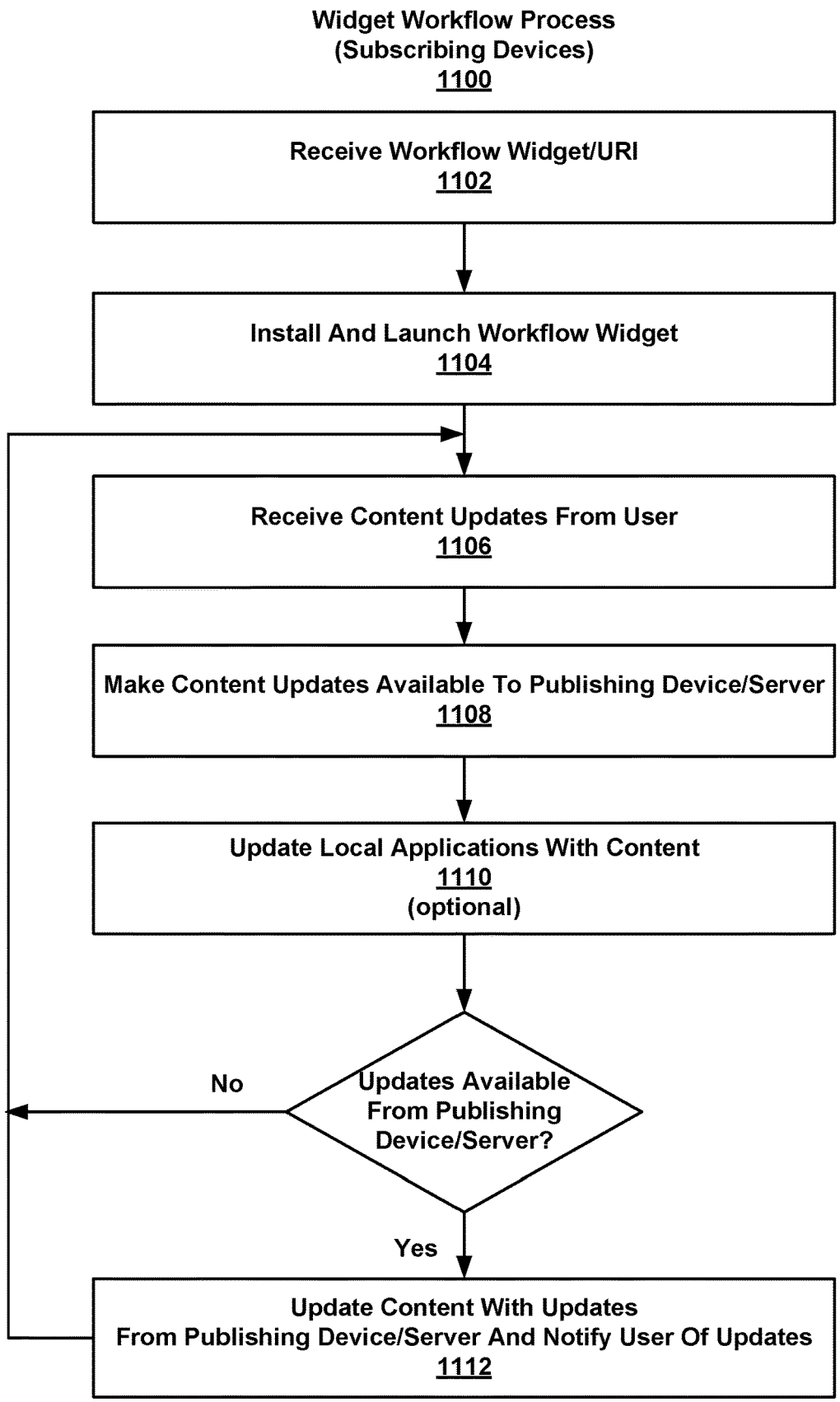
FIG. 11 is a flow diagram of an exemplary widget workflow process for a subscribing device.

Upon receipt of the updated list, Greg can further change the item list and/or push the updated list to the other party planners, as described with respect to FIGS. 9-11. The updated list appears in the user interface 600 for each party planner. Therefore, Greg was able to create a party workflow widget, send the widget to each party planner, collect and aggregate updates received from each of the party planners through the party planning widget 508, incorporate the updates into an aggregated update and push the update back to the party planning widgets 508 residing at the respective devices of the workflow participants. The push can be accomplished using known software push technologies (e.g., PointCast™, Astound™, Marimba™, BackWeb™, Intermind™, InterAgent™, etc.) and/or known instant messaging protocols (e.g., SIP, XMPP, etc.).

The party planning widget 508 described above is exemplary. There are many other workflows that could benefit from the use of a workflow widget. Other examples of workflow widgets include but are not limited to: a calendar workflow widget that allows participants to modify timelines, schedules, milestones and other time-based events for a project; an auction widget that allows participants to auction items or services and place bids; a polling widget that allows participants to cast votes or provide commentary which can be shared with other participants in an opinion poll or election; a purchase order widget that facilitates the procurement and supply of products or services, including the exchange of offers, acknowledgments, bids, change orders, return material authorizations and the like; and a chat widget that allows participants to discuss a topic of their choosing.

Managing Workflow Widgets

Figure 7:
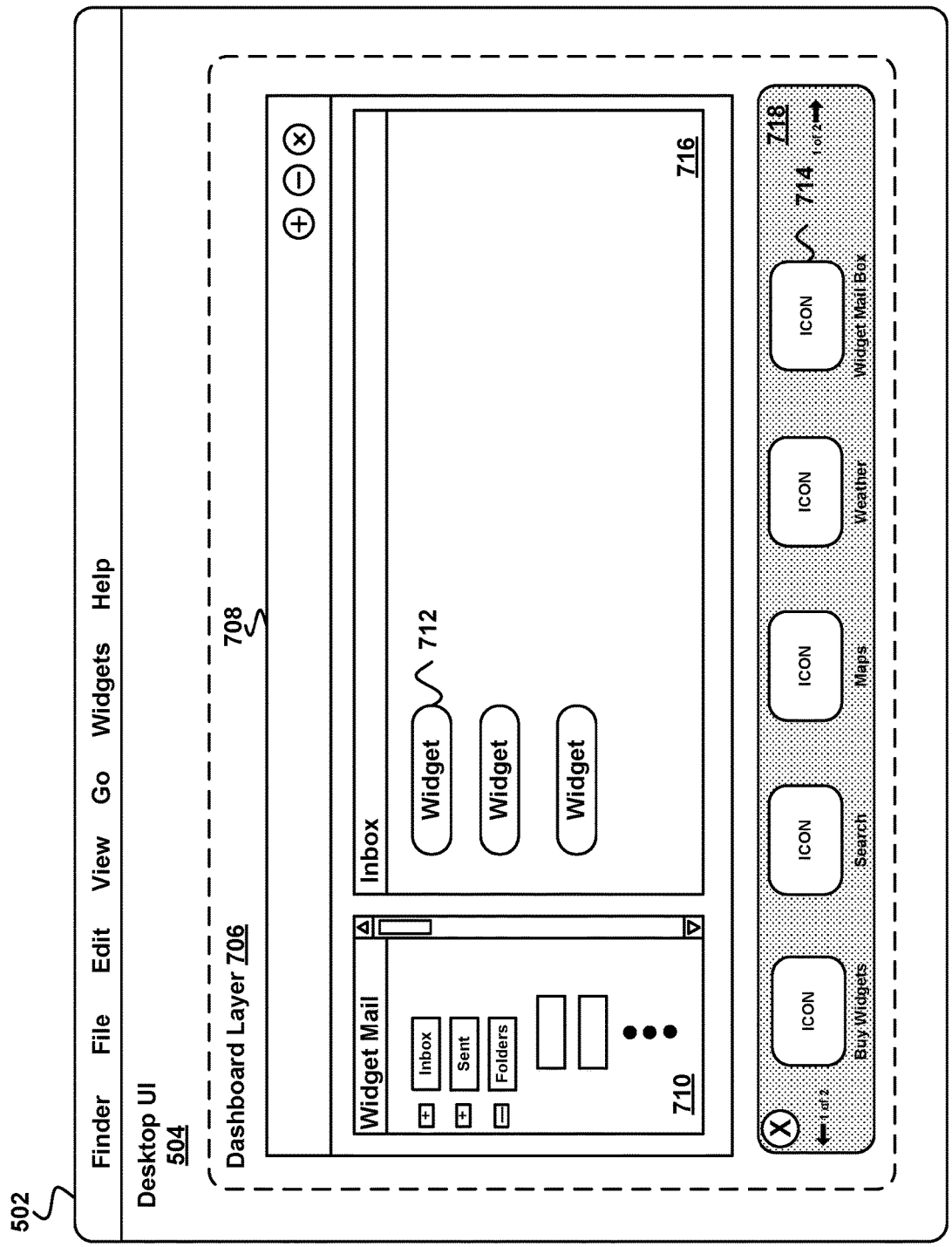
FIG. 7 is a screen shot depicting an exemplary application for managing workflow widgets.

FIG. 7 is a screen shot depicting an exemplary application for managing workflow widgets. Some users may receive large numbers of workflow widgets from a variety of sources. Many of these widgets may required a response or information from the user. For such users, a workflow widget management application can be invoked for organizing and managing workflow widgets. In some implementations, workflow widgets are managed by a management application that can be invoked by a user through a menu bar 502, button or other input mechanism. Alternatively, the management application can be invoked or launched automatically when workflow widgets are received or programmatically by other applications (e.g., word processors, browsers, etc.). In some implementations, the management application can be launched by the user clicking on an associated icon 714 in a configuration bar 718.

In some implementations, when the management application is launched a user interface 708 is displayed. For example, the user interface 708 can be displayed in a dashboard layer 706 overlaying a desktop UI 504. The UI 708 can include a navigation pane 710 for displaying a file structure that includes folders for organizing workflow widgets. Similar to conventional email file structures, there can be an inbox folder, outbox, sent item folder, follow-up folder, quarantine folder, search folder, junk widget folder, and other suitable folder for storing widgets in an organized manner. The UI 708 can also include a reading pane 716 for displaying the contents of the various folders listed in the navigation pane 710. For example, when the inbox folder is selected, then the reading pane 716 displays the contents of the user's inbox. In this example, icons 712 associated with workflow widgets are displayed in the reading pane 716. In some implementations, the user can click on the widget icons 712 and the associated widgets will launch and display a user interface 600, as described with respect FIG. 6.

It should be apparent that the UI 708 is exemplary and other UIs are possible, which can include various features for organizing workflow widgets, including features found in conventional email applications (e.g., rules and alerts, out of office assistants, requests for receipts, etc.).

Workflow Communication System

Figure 8:
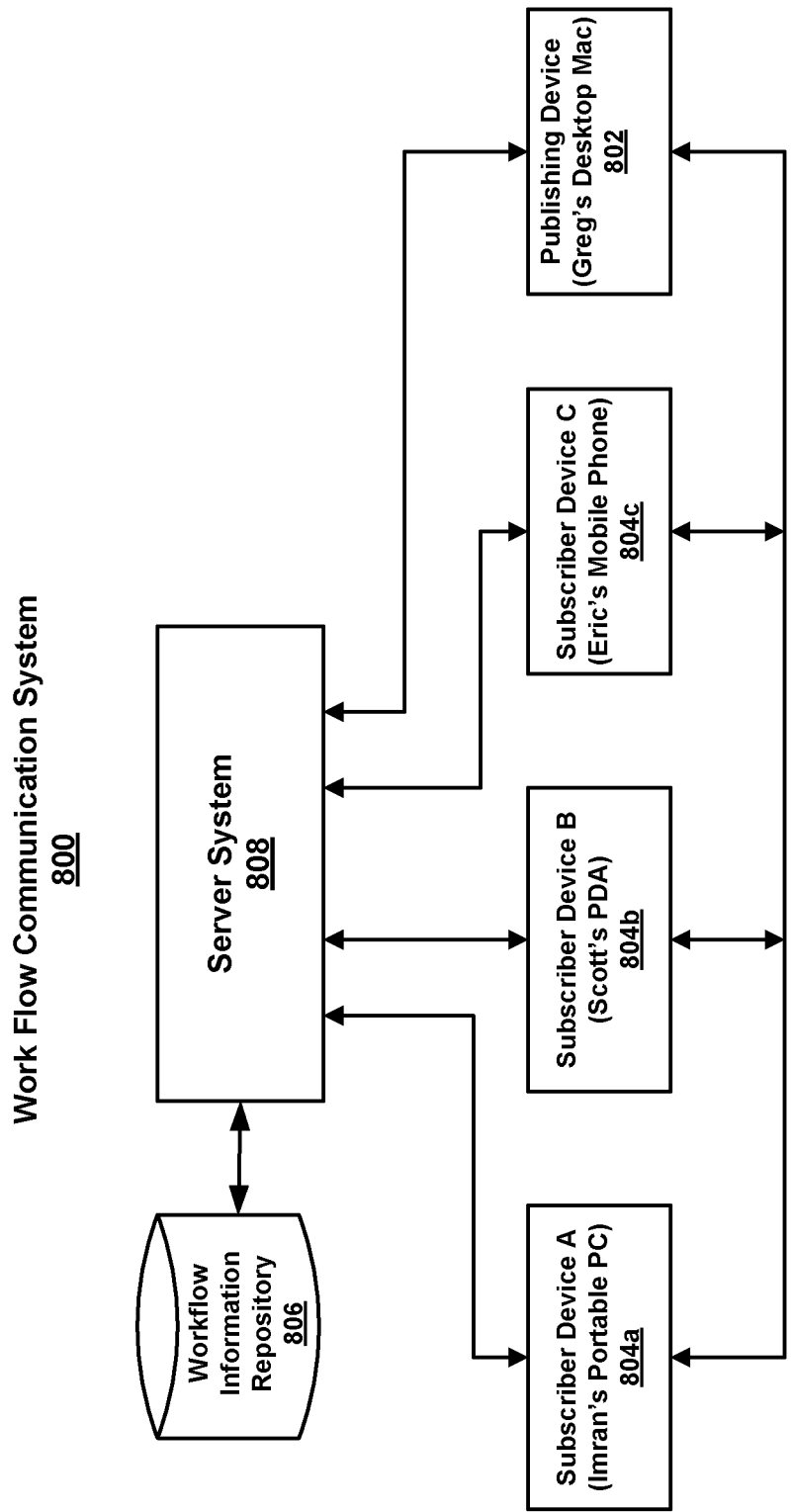
FIG. 8 is a block diagram depicting an exemplary workflow communication system for workflow widgets.

FIG. 8 is a block diagram depicting an exemplary workflow communication system 800 for workflow widgets. The system 800 provides a peer-to-peer or client/server infrastructure for workflow widgets. The system 800 generally includes a publishing device 802, one or more subscriber devices 804 and a server system 808. The server system 808 is coupled to a repository 806. The publishing device 802 and the subscribing devices 804 can communicate with the server system 808 (client/server implementations) and/or with each other (peer-to-peer). For a peer-to-peer topology, the workflow information repository 806 can be included as part of the publishing device 802 (e.g., a computer hard drive). An advantage of the peer-to-peer topology is that any subscriber device 804 can be a publishing device 802 and can maintain a workflow information repository 806. The workflow can continue even if one of the subscriber devices 804 is offline. In some implementations, the system 800 operates with a client/server topology under normal operating conditions, but can reconfigure into a peer-to-peer topology if the server system 808 is down.

In some implementations, the publishing device 802 belongs to the original author of the workflow widget. Using the previous example, Greg was the original author of the party planning widget 508 (FIG. 5). In some implementations, the party planning widget 508 can be authored by Greg at the publishing device 802 (e.g., a desktop computer) using a widget authoring and editing environment, such as the environment described in co-pending U.S. patent application Ser. No. 11/145,577, entitled "Widget Authoring and Editing Environment," filed Jun. 3, 2005. Alternatively, the party planning widget 508 can by created by another individual or entity and simply customized by Greg. For example, the party planning widget 508 could be included with an operating system or downloaded from a third party website. In some implementations, the party planning widget 508 can be provided by a third party service provider, which allows Greg to select from a library of widgets and to customize the widget over a network connection (e.g., the Internet, wireless, etc.). In such an implementation, the third party service provider can maintain the widget authoring and editing environment, and also establish and maintain network connections with one or more subscribing devices (e.g., PDA, portable computer, mobile phone, etc.).

After creating the party planning widget 508, Greg sends the widget to each of the subscribing devices 804 as an attachment to email or by other known communication means. Alternatively, Greg can push the party planning widget 508 to each subscriber device 804 using a push technology (e.g., PointCast™, Intermind™, etc.). The party planning widget 508 can be received at the subscribing devices 804 by, for example, the management application described with respect to FIG. 7. A subscribing device 804 can be any device capable of receiving information over a communication link or channel, including but not limited to: portable and desktop computers, servers, electronics, media players, game devices, mobile phones, email devices, personal digital assistants (PDAs), televisions, etc. For example, Imran can receive the party planning widget 508 on a portable PC 804*a*, Scott can receive the party planning widget 508 on a PDA 804*b* and Eric can receive the party planning widget 508 on a mobile phone. Once the party planning widget 508 is received, it can be interacted with as described with respect to FIGS. 5 and 6. If the party planning widget 508 is already installed on a subscribing device 804, then Greg could send an email with a link that can be used to launch the party planning widget 508 at the subscriber device 804, as described with respect to FIGS. 5 and 6. Other methods or systems for distributing a workflow widget to subscriber devices are possible. For example, each subscriber device 804 could download or otherwise obtain a copy of the workflow widget (or link) directly from the server system 808 or from a third party distributor.

Software Architecture

FIG. 9 is a block diagram of an exemplary software architecture 900 for workflow widgets. The architecture 900 can be a stand-alone application or part of an operating system process, component and/or plug-in. The software architecture can also be characterized as a framework or model that can be implemented on various platforms and/or networks (e.g., peer-to-peer or client/server networks, stand-alone computers, portable electronic devices, mobile phones, etc.), and/or embedded or bundled with one or more software applications (e.g., email, media player, browser, etc.).

The architecture 900 includes a dashboard server 906, dashboard clients 902, widgets 904, operating system 914 and a workflow information repository 912. The architecture 900 is similar to the dashboard architecture 300 shown in FIG. 3 and operates in a similar manner. In the architecture 900, however, the dashboard server 906 also includes a workflow communication manager 908 and a workflow environment manager 910. In a publishing device or server system (e.g., publishing device 802 or server system 808), the workflow communication manager 908 is responsible for establishing connectivity, establishing sessions and managing the transfer of information to subscribing devices 804. In a subscribing device (e.g., a subscribing device 804), the workflow communication manager 908 performs a similar function with respect to the publishing device 802 or server system 808. Depending upon the status of the device (i.e., publishing or subscribing), the workflow communication manager 908 includes one or more software components for transmitting workflow widgets, collecting updates from subscribing devices, publishing widgets, pushing updates to subscribing devices and any other tasks related to workflow communication.

Depending upon the status of the device, the workflow environment manager 910 is responsible for managing workflow widgets, authoring or editing workflow widgets, and any other tasks associated with the installation, previewing, launching, updating, operation or interaction with workflow widgets, including generating and displaying the user interfaces described with respect to FIGS. 6 and 7.

The workflow information repository 912 is coupled to the dashboard server 906, and can be used to store information regarding the workflow widgets, publishing devices and subscribing devices, etc. In subscribing devices, it can be used to store a log or history of interactions with a workflow widget. The repository 912 can also store various configuration data associated with workflow widgets, dashboards, security information, etc.

The workflow communication manager 908 and the workflow environment manger 910 do not have to be part of the dashboard server 906. Rather, these components can be standalone applications or an operating system component, process, and/or plugin.

Widget Workflow Process

FIG. 10 is a flow diagram of an exemplary widget workflow process 1000 for the publisher device or server system depending on the topology employed. The steps of process 1000 does not have to occur in any specific order and at least some steps can be performed in parallel in a multithreading and/or multiprocessing environment.

Workflow widgets can operate in a variety of networks including but not limited to peer-to-peer networks and client/server networks. These networks can include publishing widgets and subscribing widgets. In a peer-to-peer network each device can be both a publishing device and a subscribing device. In such a network, the device that starts the workflow can be referred to as a publishing device. In some implementations, the publishing device will keep track of the workflow information (e.g., number of subscribing devices, updates from subscribing devices, etc.) and the workflow state (e.g., phase of completion, etc.).

In a client/server network, a server system maintains workflow information and status for subscribing devices. The server system can be operated by a service provider that charges a subscription fee. In some implementations, workflow widgets can be bundled with other services (e.g., email, Internet access, etc.). Users of subscribing devices can generate workflow widgets by interacting with the server system. For example, a user can use a browser to search a library of workflow widgets for a suitable workflow widget, then configure the widget as desired by, for example, adding or modifying content and specifying one or more subscribing devices that will receive the widget. The server system then establishes connections with subscribing devices and sends the workflow widget to each subscribing device (e.g., via email). Any updates to the content of the workflow widget made at the subscribing devices can be aggregated by the server system and stored in a workflow information repository (e.g., the repository 912).

Process Flow at the Publishing Device/Server System

The widget workflow process 1000 can begin when a workflow widget is created and sent to one or more subscribing devices (1002). In some implementations, the widget can be created using a widget authoring and editing application, as described in U.S. patent application Ser. No. 11/145,577, entitled "Widget Authoring and Editing Environment," filed Jun. 3, 2005. Alternatively, an existing workflow widget can be modified to include content, such as files, documents, text messages, instructions, images, music, video, audio, software, URLs or URIs and any other information or materials for carrying out a workflow. For example, a workflow widget can include a URL to a website containing additional information or materials (e.g., documents or other widgets) for carrying out the workflow. In some implementations, a link is sent to the subscribing devices. The link can be used to launch existing workflow widgets at the subscribed device or steer the subscriber device to a third party website for downloading a workflow widget. Other distribution methods and systems are possible.

After the workflow widget (or link) is created and sent to the subscribing devices, any content included with the workflow widget can be periodically updated by the subscribing devices and/or the publishing device or server system and made available to all the devices (1004). The content can be updated using known technologies and protocols (e.g., email, Internet conferencing, push technology, etc.), and the updates can be transmitted over a variety of transmission mediums (e.g., copper, radio frequency (RF), optical, acoustic, etc.).

When the subscribing devices receive the workflow widget, users of the subscribing devices can interact with the widget and update its contents. An exemplary interaction with a workflow widget was described with respect to FIGS. 2 and 3. Any updates to the widget contents made by users of subscribing devices can be reported back to the publishing device or a server system and stored in a workflow information repository (FIG. 8). In some implementations, the publishing device or server system requests update reports from subscribing devices using a polling scheme. Alternatively, the subscribing devices can report back updates to the publishing device or server system based on a trigger event (e.g., the user presses the send button shown in FIG. 6), or according to a schedule (e.g., once a day, Friday at 5:00 PM, etc.). In some implementations, the publishing device or server system publishes the content updates and notifies the subscribing devices when content updates are available. The subscribing devices can then seek out the content updates which can be stored, for example, in a workflow information repository (e.g., repository 912) at the publishing device or server system.

When the publishing device or server system receives the content update reports from the subscriber devices (1006), the publishing device or server system can aggregate the content update reports into a single update for that can be made available to one or more subscribing devices (1008). In some implementations, the content update reports are aggregated by comparing the content update reports to a current state of the content stored and maintained at the publishing device or server system, then aggregating the content based on the results of the comparisons. For example, the publishing device or server system can determine any differences between the content update reports and the current state of the content stored at the publishing device or server system, and then aggregate the differences into a single content update that can be made available to one or more subscribing devices (1004), and the state of the content stored at the publishing device or server system can be updated to reflect the differences. In the party planning example, Greg receives a content update report from Scott, including an updated item list that now includes soda pop (FIG. 6). The publishing device or server system, can then aggregate Scott's content update report with any other content update reports from other subscribing devices (including any updates that Greg may have made using the publishing device), and publish the updates and/or push the updates to the subscribing devices, so that Imran, Scott and Eric have a complete item list and know the item that each friend will bring to the party.

The implementations described above enable the content of a workflow widget to be periodically updated on subscribing devices and the publishing device or server system, so that the subscribing devices and the publishing device or server system can provide their respective users with current content while allowing each device to asynchronously change the content. Thus, the workflow widget can simplify a workflow process by providing the current content to multiple participants in the workflow process, allowing the participants to update or modify the content, and then ensuring that any changes to the content are provided to the participants in a timely manner (e.g., real-time or near real-time).

In some implementations, the publishing device or server system tracks the progress of the workflow and will communicate with subscribing devices to manage the workflow process to ensure its completion. For example, if Scott does not interact with the workflow widget for a predetermined period of time, the publishing device or server system can send a message (e.g., email, instant message, telephone call, etc.) to the subscribing device requesting a response. In some implementations, the publishing device or server system monitors the presence of the subscribing devices and sends messages only when the subscribing device is present (i.e., available for receiving communications). The various features associated with the publishing device or server system can be configured by a user (e.g., Greg) through a preference pane or other input mechanism. For example, Greg can set the publishing device or server system to notify him when updates are received or if a subscribing device has failed to respond.

FIG. 11 is a flow diagram of an exemplary widget workflow process 1100 for the subscriber devices. The process 1100 begins when a subscribing device receives a workflow widget from a publishing device or server system (1102). In some implementations, when the workflow widget is received it is automatically installed and launched on the subscribing device (1104). Alternatively, the subscribing device can request authorization to install prior to installing In some implementations, the user can preview the contents of the workflow widget, as described in co-pending U.S. patent application Ser. No. 11/282,110, for "Preview Including Theme Based Installation of User Interface Elements In A Display Environment."

In some implementations, the workflow widget is authenticated or subjected to other security procedures before being installed or launched. For example, the workflow widget can be signed by the publishing device or server system and authenticated by the subscribing devices using known authentication techniques (e.g., asymmetric public key encryption, elliptic encryption, etc.)

When the workflow widget is installed and launched, the users of the subscribing devices can interact with the widget and update its contents (1106). The updates are then sent back to the publishing device or server system (1108) where they are aggregated and used to prepare updates for the subscribing devices participating in the workflow, as described with respect to FIG. 10. In some implementations, applications that are local to the subscribing devices can be updated using the updated content of the workflow widget (1110). For example, Scott's Outlook® calendar can be updated by the workflow widget with the date and time of the party, and a task can be created in an Outlook® task list for reminding Scott to bring the soda pop.

In addition to sending updates to the publishing device or server system, the subscribing devices also periodically receive or seek published updates from the publishing device or server system. The updates can be made available to all subscribing devices in parallel (e.g., multicasting) or to individual subscribing devices serially in accordance with a predetermined order. If updates are received or retrieved from the publishing device or server system, then the subscribing device will update itself with the updates and notify the user that an update has occurred (1112). For example, after Scott's update report is received by the publishing device or server system, the publishing device or server system aggregates Scott's updates with any other updates from other subscribing devices (including the publishing device or server system) and pushes (or publishes) the updates to the subscribing devices participating in the workflow, as described with respect to FIG. 10.

It should be apparent that the communication between publishing devices and subscribing devices can be implemented using a variety of known network topologies and technologies.

Communicating with Widgets Using URL Requests

As described with respect to FIGS. 5 and 6, links associated with workflow widgets can be included in user interfaces (e.g., email). When a link is selected one or more widgets associated with the link can be instantiated or launched and displayed. In some implementations, the link can be a URL request which can be used to facilitate the communication of information between a workflow widget and a web page, another widget, a dashboard or any other information resource. Generally, URL Requests can include a message body which can be used to communicate any information (e.g., files, images, data, etc.) to widgets. Widgets can use URL Requests to communicate directly with each other or indirectly through other processes or systems (e.g., a dashboard server), as described more fully in U.S. patent application Ser. No. 11/403,644, entitled "Linked Widgets."

A process can be a widget or application and can communicate with one or more application or operating system processes (e.g., Word, email, Mac OS, etc.). In some implementations, URL Requests are handled by a dedicated process, which receives messages, data and other information from URLs, and distributes it or otherwise makes it available to one or more client processes (e.g., widgets, applications, other processes, etc.).

An exemplary URL Request for communicating between a process (e.g., a web page) and a widget can have the following format:

"dashboard-widget:
new=com.apple.widget.helloweb?message=New."

The various components of this exemplary URL Request are described in Table I below.

TABLE I

Exemplary URL Request Format

| Field | Function |
| --- | --- |
| dashboard-widget: | Notifies the browser that the link is directed towards a dashboard. |
| new= | A command that informs a dashboard to provide a new widget. In this example, there are six commands to choose from:<br>"new="—Provides a new widget based on a bundle identifier.<br>"newWithPath="—Provides a new widget based on a path.<br>"open="—Provides a new widget if it does not exist, based on a bundle identifier. |

TABLE I-continued

Exemplary URL Request Format

| Field | Function |
| --- | --- |
| | "openWithPath="—Provides a new widget if it does not exist, based on a path.<br>"send="—Sends data to an existing widget. If the widget does not exist, then nothing happens.<br>"sendWidthID="—Sends data to an existing widget based on its widget.identifier.value. If the widget does not exist, then nothing happens. |
| com.apple.widget.helloweb | A bundle identifier for a target widget named "Hello Web." |
| ? | Anything after ? is a query stream. Separates the identification portion of the URL Request from the data to be passed to the widget "Hello Web." |
| message | An arbitrary key for the next bit of data that is passed to the target widget. Inside of the widget "Hello Web," this key can be accessed through an array. |
| = | Separates a key from its corresponding value in a key = value pair. |
| new | An arbitrary string. This value is returned when the previous key in the widget is requested. |
| @ | Separates key-value pairs to allow multiple key-value pairs to be sent to a widget in a single URL Request. |

Examples Commands

It should be apparent that many types of commands and data can be used with a URL Request. Examples of three commands will now be described with respect to FIGS. 12A-12C.

The "new=" command opens a new widget based on a supplied bundle identifier (new=) or a supplied path (newWithPath=). The new widget can include a property that contains an associative array in which one or more key-value pairs can be parsed and stored for use by the widget "Hello Web." For example, dashboard-widget: new=com.apple.widget.helloweb?message=New," would open a new "Hello Web" widget. FIG. 12A illustrates how the widget would be displayed.

The "send=&sendWithIdentifier=" command sends data to an existing widget based on a supplied bundle identifier (send=) or a widget identifier (sendWithIdentifier=). A property in the widget can be assigned to a handler. The handler can be passed an associative array containing key-value pairs found in the data portion of a URL Request. For example, "dashboard-widget: send=com.apple.widget.helloweb?message=Send" would send a message to an existing instance of the "Hello Web" widget. FIG. 12B illustrates how the widget would be displayed.

The command "open=&openWithPath=" acts like a "send=" command if a widget of the specified bundle identifier or path already exists, and acts like a "new=" command if a widget of the specified bundle identifier or path does not already exist. For example, "dashboard-widget:Open=com.apple. widget.helloweb?message=Open" either sends a message to an existing instance of the Hello Web widget or creates a new instance if none exists. FIG. 12C illustrates how the widget would be displayed.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:
  displaying, by a first device, a user interface including a first instant messaging window for allowing a user to type an instant message and a dashboard containing a plurality of widgets;
  receiving, by the first device, a first user input by a first user, the first input selecting a widget in the dashboard;
  responsive to the first user input, inserting a link to content associated with the selected widget in the instant messaging window;
  receiving, by the first device, second user input to send the instant message containing the link to a second device;
  receiving, by the second device, the instant message including message text and the link, wherein the second device is a subscriber to a push notification service, and the instant message is sent from the first device to the second device using the push notification service;
  causing the second device to display, in a second instant messaging window, the message text and the link;
  receiving third user input by a second user of the second device, the third user input selecting the link displayed in the second instant messaging window; and
  in response to the third user input, initiating access to the content associated with the link on the second device.

2. The method of claim 1, wherein, the user interface includes a first identifier of a user of the first device and a second identifier of a user of the second device.

3. The method of claim 1, comprising pushing edited content from the first device to the second device through a server.

4. The method of claim 3, wherein the pushing is performed through a communication protocol that is different from a communications protocol under which the message is sent to the first device.

5. The method of claim 1, wherein the user interface is presented outside of the first instant messaging application.

6. The method of claim 1, wherein the link is a uniform resource indicator (URI) or uniform resource locator (URL), and the method further comprises:
  storing, by the first device, data associated with the content in a message body of the URI or URL.

7. A system comprising:
  one or more processors; and
  at least one non-transitory storage device storing instructions that, when executed by the one or more processors, cause the one or more processors to perform operations comprising:
  displaying, by a first device, a user interface including a first instant messaging window for allowing a user to type an instant message and a dashboard containing a plurality of widgets;
  receiving, by the first device, a first user input by a first user, the first input selecting a widget in the dashboard;
  responsive to the first user input, inserting a link to content associated with the selected widget in the instant messaging window;
  receiving, by the first device, second user input to send the instant message containing the link to a second device;
  receiving, by the second device, the instant message including message text and the link, wherein the second device is a subscriber to a push notification service, and the instant message is sent from the first device to the second device using the push notification service;
  causing the second device to display, in a second instant messaging window, the message text and the link;
  receiving third user input by a second user of the second device, the third user input selecting the link displayed in the second instant messaging window; and
  in response to the third user input, initiating access to the content associated with the link on the second device.

8. The system of claim 7, wherein, the user interface includes a first identifier of a user of the first device and a second identifier of a user of the second device.

9. The system of claim 7, the operations comprising pushing edited content from the first device to the second device through a server.

10. The system of claim 9, wherein the pushing is performed through a communication protocol that is different from a communications protocol under which the message is sent to the first device.

11. The system of claim 7, wherein the user interface is presented outside of the first instant messaging window.

12. The system of claim 7, wherein the link is a uniform resource indicator (URI) or uniform resource locator (URL), and the operations further comprise:
  storing, by the first device, data associated with the content in the URI or URL.

13. A non-transitory storage device storing instructions that, when executed by one or more processors, cause the one or more processors to perform operations comprising:
  displaying, by a first device, a user interface including a first instant messaging window for allowing a user to type an instant message and a dashboard containing a plurality of widgets;
  receiving, by the first device, a first user input by a first user, the first input selecting a widget in the dashboard;
  responsive to the first user input, inserting a link to content associated with the selected widget in the instant messaging window;
  receiving, by the first device, second user input to send the instant message containing the link to a second device;
  receiving, by the second device, the instant message including message text and the link, wherein the second device is a subscriber to a push notification service, and the instant message is sent from the first device to the second device using the push notification service;
  causing the second device to display, in a second instant messaging window, the message text and the link;
  receiving third user input by a second user of the second device, the third user input selecting the link displayed in the second instant messaging window; and
  in response to the third user input, initiating access to the content associated with the link on the second device.

14. The non-transitory storage device of claim 13, wherein, in the user interface includes a first identifier of a user of the first device and a second identifier of a user of the second device.

15. The non-transitory storage device of claim 13, the operations comprising pushing edited content from the first device to the second device through a server.

16. The non-transitory storage device of claim 15, wherein the pushing is performed through a communication protocol that is different from a communications protocol under which the message is sent to the first device.

17. The non-transitory storage device of claim 13, wherein the link is a uniform resource indicator (URI) or uniform resource locator (URL), and the operations further comprise:

storing, by the first device, data associated with the edited content in the URI or URL.

\* \* \* \* \*